United States Patent
Richards et al.

(10) Patent No.: US 7,651,781 B2
(45) Date of Patent: Jan. 26, 2010

(54) POLYPROPYLENE CONTAINER AND PROCESS FOR MAKING THE SAME

(75) Inventors: Guy Richards, Oshkosh, WI (US); A. B. M. Bazlur Rashid, Neenah, WI (US); Robert W. Knoll, Neenah, WI (US); Sahin Emre, Appleton, WI (US); Kevin James Curie, Appleton, WI (US); Randolph Lee Davidson, Menasha, WI (US)

(73) Assignee: Ball Corporation, Broomfield, CO (US)

( * ) Notice: Subject to any disclaimer, the term of this patent is extended or adjusted under 35 U.S.C. 154(b) by 591 days.

(21) Appl. No.: 11/362,614

(22) Filed: Feb. 27, 2006

(65) Prior Publication Data

US 2006/0147664 A1 Jul. 6, 2006

Related U.S. Application Data

(63) Continuation of application No. 10/046,500, filed on Oct. 24, 2001, now abandoned.

(51) Int. Cl.
*B29B 7/00* (2006.01)
(52) U.S. Cl. .................. 428/542.8; 428/515; 428/516; 428/35.7; 428/34.1
(58) Field of Classification Search .............. 428/542.8, 428/515, 516, 35.7, 34.1
See application file for complete search history.

(56) References Cited

U.S. PATENT DOCUMENTS

| | | | |
|---|---|---|---|
| 2,927,106 A | 3/1960 | Hepp et al. | |
| 2,928,756 A | 3/1960 | Campbell | |
| 2,929,807 A | 3/1960 | Leatherman et al. | |
| 2,930,726 A | 3/1960 | Jones et al. | |
| 2,930,788 A | 3/1960 | Banks | |
| 2,936,303 A | 5/1960 | Goins | |
| 2,944,049 A | 7/1960 | Edmonds, Jr. | |
| 2,962,490 A | 11/1960 | Edmonds, Jr., et al. | |
| 2,969,348 A | 1/1961 | Fawcett | |
| 2,969,408 A | 1/1961 | Nowlin et al. | |
| 2,970,991 A | 2/1961 | Cines | |
| 2,972,604 A | 2/1961 | Reynolds et al. | |
| 2,973,088 A | 2/1961 | Canterino | |
| 2,973,241 A | 2/1961 | Scott, Jr., et al. | |

(Continued)

FOREIGN PATENT DOCUMENTS

EP 0737621 10/1996

(Continued)

OTHER PUBLICATIONS

Phillip T. DeLassus and Nicole F. Whiteman, "Physical and Mechanical Properties of Some Important Polymers", *Polymer Handbook*, 4th ed., pp. 159-169 (Feb. 22, 1999).

(Continued)

*Primary Examiner*—Michael C Miggins
(74) *Attorney, Agent, or Firm*—McDermott Will & Emery LLP

(57) ABSTRACT

A multilayer plastic container comprises a layer of a polypropylene and an intermediate layer directly adjacent the layer of polypropylene wherein at least one of the polypropylene and intermediate layers comprises an adhesive such as maleic anhydride incorporated therein to adhere the layer of polypropylene to the layer of EVOH.

4 Claims, 15 Drawing Sheets

U.S. PATENT DOCUMENTS

| | | |
|---|---|---|
| 2,997,456 A | 8/1961 | Mills |
| 3,001,968 A | 9/1961 | Canterino et al. |
| 3,005,793 A | 10/1961 | Wagner |
| 3,007,902 A | 11/1961 | Nelson |
| 3,007,905 A | 11/1961 | Bailey |
| 3,013,820 A | 12/1961 | Pouppirt |
| 3,023,180 A | 2/1962 | Canterino et al. |
| 3,023,198 A | 2/1962 | Nowlin et al. |
| 3,024,227 A | 3/1962 | Nowlin et al. |
| 3,035,953 A | 5/1962 | Arnold |
| 3,049,529 A | 8/1962 | Wicklatz et al. |
| 3,050,510 A | 8/1962 | Canterino et al. |
| 3,050,513 A | 8/1962 | Zelinski et al. |
| 3,051,288 A | 8/1962 | Borodin |
| 3,051,692 A | 8/1962 | Lyons |
| 3,067,184 A | 12/1962 | Cines |
| 3,074,616 A | 1/1963 | Martinovich et al. |
| 3,075,026 A | 1/1963 | Banks |
| 3,076,776 A | 2/1963 | Findlay |
| 3,084,149 A | 4/1963 | Stevens et al. |
| 3,086,957 A | 4/1963 | Carter |
| 3,086,958 A | 4/1963 | Canterino et al. |
| 3,098,062 A | 7/1963 | Hogan |
| 3,099,639 A | 7/1963 | Cobb et al. |
| 3,101,327 A | 8/1963 | Lyons |
| 3,101,328 A | 8/1963 | Edmonds, Jr. |
| 3,102,876 A | 9/1963 | Hogan |
| 3,108,094 A | 10/1963 | Morgan |
| 3,108,324 A | 10/1963 | Zavasnik |
| 3,118,857 A | 1/1964 | Carr |
| 3,119,798 A | 1/1964 | Moberly et al. |
| 3,119,801 A | 1/1964 | Haskell |
| 3,120,506 A | 2/1964 | Carr |
| 3,123,583 A | 3/1964 | Howard et al. |
| 3,124,622 A | 3/1964 | Cywinski |
| 3,127,370 A | 3/1964 | Head |
| 3,130,188 A | 4/1964 | Hogan |
| 3,147,239 A | 9/1964 | Canterino et al. |
| 3,157,564 A | 11/1964 | Tucker et al. |
| 3,165,504 A | 1/1965 | Hogan |
| 3,172,872 A | 3/1965 | Kraus et al. |
| 3,174,957 A | 3/1965 | Hall |
| 3,176,347 A | 4/1965 | Shaul |
| 3,177,188 A | 4/1965 | Ray et al. |
| 3,177,193 A | 4/1965 | Scott, Jr. |
| 3,182,049 A | 5/1965 | Moberly |
| 3,183,221 A | 5/1965 | Axe et al. |
| 3,188,258 A | 6/1965 | Young |
| 3,208,982 A | 9/1965 | Davis |
| 3,210,332 A | 10/1965 | Lyons et al. |
| 3,210,910 A | 10/1965 | Seefluth |
| 3,211,635 A | 10/1965 | Cywinski |
| 3,213,071 A | 10/1965 | Campbell |
| 3,215,682 A | 11/1965 | Farrar et al. |
| 3,218,224 A | 11/1965 | Osborn |
| 3,219,649 A | 11/1965 | Nowlin et al. |
| 3,223,694 A | 12/1965 | Farrar, Jr. |
| 3,228,896 A | 1/1966 | Canterino et al. |
| 3,231,650 A | 1/1966 | Findlay et al. |
| 3,232,920 A | 2/1966 | Naylor |
| 3,245,975 A | 4/1966 | Zelinski |
| 3,258,456 A | 6/1966 | Nelson |
| 3,280,092 A | 10/1966 | Edmonds, Jr. |
| 3,285,889 A | 11/1966 | Arnold |
| 3,287,342 A | 11/1966 | Walton |
| 3,288,773 A | 11/1966 | Harban et al. |
| 3,294,868 A | 12/1966 | Pritchard |
| 3,299,016 A | 1/1967 | Sonnenfeld |
| 3,299,186 A | 1/1967 | Wallace |
| 3,303,239 A | 2/1967 | Cleary et al. |
| 3,304,281 A | 2/1967 | Tucker |
| 3,308,073 A | 3/1967 | Kepple |
| 3,310,505 A | 3/1967 | Parker |
| 3,313,786 A | 4/1967 | Kahle et al. |
| 3,313,794 A | 4/1967 | Cleary |
| 3,317,502 A | 5/1967 | Harban et al. |
| 3,318,721 A | 5/1967 | Lineburg |
| 3,332,921 A | 7/1967 | Cleary |
| 3,332,928 A | 7/1967 | Farrar |
| 3,336,280 A | 8/1967 | Naylor |
| 3,345,431 A | 10/1967 | Harban |
| 3,347,955 A | 10/1967 | Renaudo |
| 3,347,966 A | 10/1967 | Seefluth |
| 3,354,138 A | 11/1967 | Burr |
| 3,354,235 A | 11/1967 | Hogan et al. |
| 3,358,056 A | 12/1967 | Renaudo |
| 3,372,140 A | 3/1968 | Witt |
| 3,402,216 A | 9/1968 | Hutson, Jr. |
| 3,403,072 A | 9/1968 | Wheat |
| 3,404,104 A | 10/1968 | Hill et al. |
| 3,409,495 A | 11/1968 | Rasmussen |
| 3,412,188 A | 11/1968 | Seefluth |
| 3,415,710 A | 12/1968 | Arnold |
| 3,429,862 A | 2/1969 | Fodor |
| 3,436,380 A | 4/1969 | Davison |
| 3,439,380 A | 4/1969 | Seefluth |
| 3,444,153 A | 5/1969 | Fodor |
| 3,445,367 A | 5/1969 | Kallenbach |
| 3,445,543 A | 5/1969 | Gruver |
| 3,452,120 A | 6/1969 | Arnold |
| 3,454,545 A | 7/1969 | Scoggin |
| 3,454,675 A | 7/1969 | Scoggin |
| 3,457,322 A | 7/1969 | Wentz, Jr. |
| 3,475,517 A | 10/1969 | Renaudo |
| 3,485,890 A | 12/1969 | Dixon |
| 3,489,729 A | 1/1970 | Kahle et al. |
| 3,513,152 A | 5/1970 | Hogan |
| 3,525,123 A | 8/1970 | Cines et al. |
| 3,531,553 A | 9/1970 | Bodkins |
| 3,536,797 A | 10/1970 | Cowan et al. |
| 3,538,565 A | 11/1970 | Simpson et al. |
| 3,544,518 A | 12/1970 | Bodkins et al. |
| 3,546,312 A | 12/1970 | Heckelsberg et al. |
| 3,554,961 A | 1/1971 | Moon |
| 3,565,853 A | 2/1971 | Moon |
| 3,579,478 A | 5/1971 | Dunn et al. |
| 3,579,602 A | 5/1971 | Reusser |
| 3,586,731 A | 6/1971 | Heckelsberg |
| 3,590,095 A | 6/1971 | Zeuch |
| 3,600,371 A | 8/1971 | Marwil |
| 3,600,487 A | 8/1971 | Zavasnik |
| 3,607,987 A | 9/1971 | Walton et al. |
| 3,620,435 A | 11/1971 | Sogi |
| 3,627,869 A | 12/1971 | Walton |
| 3,761,550 A | 9/1973 | Seefluth |
| 3,770,408 A | 11/1973 | McCully |
| 3,878,033 A | 4/1975 | Zavasnik |
| 3,882,212 A | 5/1975 | Edwards |
| 3,882,259 A | 5/1975 | Nohara et al. |
| 3,893,957 A | 7/1975 | Mixon et al. |
| 3,932,692 A | 1/1976 | Hirata et al. |
| 4,131,666 A | 12/1978 | Agrawal et al. |
| 4,198,327 A | 4/1980 | Matsumoto et al. |
| 4,357,288 A * | 11/1982 | Oas et al. .................. 264/40.6 |
| 4,397,916 A | 8/1983 | Nagano |
| 4,405,667 A | 9/1983 | Christensen et al. |
| 4,407,897 A | 10/1983 | Farrell et al. |
| 4,451,512 A | 5/1984 | Yazaki et al. |
| 4,464,328 A | 8/1984 | Yoshino et al. |
| 4,501,779 A | 2/1985 | Hsu et al. |
| 4,501,797 A | 2/1985 | Super et al. |
| 4,511,610 A | 4/1985 | Yazaki et al. |
| 4,519,977 A | 5/1985 | Kawaguchi et al. |
| 4,526,821 A | 7/1985 | McHenry et al. |

| | | | |
|---|---|---|---|
| 4,552,714 A | 11/1985 | Krueger et al. | |
| 4,701,360 A | 10/1987 | Gibbons et al. | |
| 4,705,708 A | 11/1987 | Briggs et al. | |
| 4,731,266 A | 3/1988 | Bonnebat et al. | |
| 4,741,936 A | 5/1988 | Nohara et al. | |
| 4,762,248 A | 8/1988 | Uhlig | |
| 4,774,144 A | 9/1988 | Jachec et al. | |
| 4,803,102 A | 2/1989 | Raniere et al. | |
| 4,846,656 A | 7/1989 | Denis et al. | |
| 4,861,526 A | 8/1989 | Gibbons et al. | |
| 4,894,267 A | 1/1990 | Bettle, III et al. | |
| 4,923,395 A | 5/1990 | Coxhead et al. | |
| 4,950,510 A | 8/1990 | Massouda | |
| 4,977,004 A | 12/1990 | Bettle, III et al. | |
| 4,990,382 A | 2/1991 | Weissenstein et al. | |
| 5,011,720 A | 4/1991 | Jabarin | |
| 5,035,851 A | 7/1991 | Schirmer | |
| 5,035,933 A | 7/1991 | Ilenda et al. | |
| 5,068,077 A | 11/1991 | Negi et al. | |
| 5,085,822 A | 2/1992 | Uehara et al. | |
| 5,129,815 A | 7/1992 | Miyazawa et al. | |
| 5,133,999 A | 7/1992 | Löfgren et al. | |
| 5,175,036 A | 12/1992 | Smiley et al. | |
| 5,183,706 A | 2/1993 | Bekele | |
| 5,202,192 A | 4/1993 | Hope et al. | |
| 5,238,718 A | 8/1993 | Yano et al. | |
| 5,303,834 A | 4/1994 | Krishnakumar et al. | |
| 5,314,987 A | 5/1994 | Kim et al. | |
| 5,320,889 A | 6/1994 | Bettle, III | |
| 5,324,528 A | 6/1994 | Wright et al. | |
| 5,360,670 A | 11/1994 | Yonezu et al. | |
| 5,399,619 A | 3/1995 | Torradas et al. | |
| 5,459,218 A | 10/1995 | Palackal et al. | |
| 5,487,940 A | 1/1996 | Bianchini et al. | |
| 5,491,023 A | 2/1996 | Tsai et al. | |
| 5,512,338 A | 4/1996 | Bianchini et al. | |
| 5,582,788 A * | 12/1996 | Collette et al. | 264/297.2 |
| 5,591,520 A | 1/1997 | Migliorini et al. | |
| 5,616,353 A | 4/1997 | Wright et al. | |
| 5,631,030 A | 5/1997 | Brun, Jr. et al. | |
| 5,635,226 A | 6/1997 | Koda et al. | |
| 5,730,919 A | 3/1998 | Wilfong et al. | |
| 5,804,016 A | 9/1998 | Schmidt et al. | |
| 5,874,115 A | 2/1999 | Dobler | |
| 6,037,022 A | 3/2000 | Adur et al. | |
| 6,037,063 A | 3/2000 | Muschiatti et al. | |
| 6,042,906 A | 3/2000 | Itoh et al. | |
| 6,110,548 A | 8/2000 | Kinsey | |
| 6,136,354 A | 10/2000 | Wood et al. | |
| 6,139,790 A | 10/2000 | Bogen et al. | |
| 6,239,210 B1 | 5/2001 | Kim et al. | |
| 6,472,081 B1 | 10/2002 | Tsai et al. | |

FOREIGN PATENT DOCUMENTS

| | | |
|---|---|---|
| JP | 64032139 | 7/1986 |
| JP | 7291248 | 11/1995 |
| JP | 11198225 | 7/1999 |
| WO | WO 97/47468 | 12/1997 |
| WO | WO 98/32601 | 7/1998 |
| WO | WO 00/63085 | 10/2000 |

OTHER PUBLICATIONS

Ethylene Polymers, vol. 6, *Encyclopedia of Polymer Science and Engineering*, vol. 6, pp. 420-423 (1986).

Co-pending U.S. Appl. No. 09/293,401, filed Apr. 16, 1999.

Co-pending U.S. Appl. No. 09/539,529, filed Mar. 30, 2000.

N. Walling and M.R. Kamal, "Phase Morphology and Properties of Injection Molded Polypropylene/Ethylene Vinyl Alcohol Copolymer Blends", *Advances In Polymer Technology*, vol. 5, No. 4, pp. 269-288 (1996).

Dr. H. Heyn, Bekum Maschinenfabriken GmbH, "PP Processing in 2 Phase Injection Stretch Blow Moulding for Packaging", Polypropylene '94, (1994) Zurich, Switzerland.

Dr. H. Heyn, "The Two-Stage Injection Stretch Blow-Moulding Process", Kunststoffe plast europe, (1994).

Product Information: Fusabond® polymers modifiers, Fusabond® Product Line, DuPont Industrial Polymers website, Oct. 30, 2000.

S.M.B. Nachtigall, R. Baumhardneto and R.S. Mauler, "A Factorial Design Applied to Polypropylene Funtionalization With Maleic Anhydride", *Polymer Engineering and Science*, vol. 39, No. 4, pp. 630-637 (1999).

Yuji Sawada, Hiromi Shigemoto, Haruhiko Tanaka, "Advanced Adhesive Resins Achieved With Metallocene Technology", Mitsui Chemicals, Inc., Future-Pak '99 handout.

S. Sanchez-Valdes, F. Orona-Villarreal, M. Lopez-Quintanilla, I. Yanez-Flores and L.F. Ramos De Valle, "Performance of Multilayer Films Using Maleated Linear Low-Density Polyethylene Blends", *Polymer Engineering and Science*, vol. 38, No. 1, pp. 150-155 (1998).

"What We Make, Maliec Anhydride (MAN)", BP Amoco Chemicals Products website, printed Feb. 15, 2000.

W.H. Gardner and L.H. Flett, "Maliec Acid, Fumeric Acid, and Maleic Anhydride", *Encyclopedia of Chemical Technology*, Third Edition, vol. 14, pp. 770-793 (1982).

Bo Pan, K. Viswanathan, C.E. Hoyle, R. Redfearn and R.B. Moore, "Photografting of Maleic Anhydride Onto Hydrocarbons: A Model Study On the Grafting Mechanism", *Polymer Preprints 2001*, 42(2), pp. 278-279.

Chapter 16, p. 482, Source unknown (date unknown).

Shucai Li, Pentti K. Jarvela and Pirkko A. Jarvela, "A Comparison Between Apparent Viscosity and Dynamic Complex Viscosity for Polypropylene/Maleated Polypropylene Blends", *Polymer Engineering and Science*, vol. 37, No. 1, pp. 18-23 (1997).

Darilyn H. Roberts, Robert C. Constable and Seshan Thiruvengada, "Advances in Maleated Polyolefins for Plastics Applications", *Polymer Engineering and Science*, vol. 37, No. 8, pp. 1421-1426 (1997).

Sidel, "Wave Lengths Frequencies Composition Applications Of The Electromagnetic Spectrum", (date unknown).

A. Derdouri, R. Connolly and R. Khayat, "Material Constants Identification for Thermoforming Simulation", ANTEC '98 handout, pp. 672-674.

D. Laroche and F. Erchiqui, "Experimental and Theoretical Study Of The Thermoformability of Industrial Polymers", ANTEC '98 handout, pp. 676-680.

Tameka Spence and Donald Hylton, "Rheological Studies of Commercial Thermoforming Materials", ANTEC'98 handout, pp. 681-689.

"Oriented Polypropylene: Strong New Contender Enters the Bottle Race", Plastics World, pp. 56-58 (1970).

"Beloit takes the wraps off its latest biaxial blow molder", Plastics Engineering, pp. 40-41 (1975).

Volker Rauschenberger, "Predicting The Processability of BOPP (Biaxially Oriented Polypropylene) Material For Film Applications On Laboratory Scale", ANTEC '98 handout, pp. 150-154.

Ashish M. Sukhadia, "The Effects Of Molecular Structure, Rheology, Morphology and Orientation On Polyethylene Blown Film Properties", ANTEC '98 handout, pp. 160-168.

Nathalie Legros, Akbar Ghaneh-Fard, Kenneth C. Cole, Abdellah Ajji and Michel M. Dumoulin, "Tensile Properties And Orientation Evolution With Processing Conditions In Polyethylene Blown Films", ANTEC '98 handout, pp. 169-173.

S. Piccarolo, "Recovery Of Uniaxially Oriented Polypropylene", pp. 443-450 source unknown (date unknown).

Arindam Datta, Jianguo J. Zhou, J. Jenny Yuan and Andrea Monisera, "The Effects of Annealing Conditions on the Structure and Properties of Polypropylene Fibers", *Medical Plastics and Biomaterials* Magazine, from devicelink.com/mpb/archive (1997).

Francesco Briatico-Vangosa and Marta Rink, "Deformational Behavior of Polyolefins at High Temperature and Strain Rate: Experimental Analysis and Constitutive Laws", *Polymer Engineering and Science*, vol. 40, pp. 1553-1563 (2000).

Phillip T. DeLassus and Nicole F. Whiteman, "Physical and Mechanical Properties of Some Important Polymers", *Polymer Handbook*, 4th ed., pp. 159-169 (date unknown).

Ethylene Polymers, vol. 6, *Encyclopedia of Polymer Science and Engineering*, vol. 6, pp. 420-423 (date unknown).

Dec. 19, 1997 computer search results listing titles and abstracts of citations numbered: 1-2 from *Energy Science and Technology*; 3 from *Engineering Index*; 4 from *Engineered Matrials Abstracts*; 5 from *Mechanical Engineering*; 6-8 from *Materials Business*; 9 from U.S. Patent Bibliographic Database; 10-20 from *Paper and Board Printing and Packaging*; 21 from *Packaging Science & Tech. Abstracts*; and 22-53 from *Rubber & Plactics Research Abstracts*.

Dec. 19, 1997 computer search results listing titles and abstracts of citations numbered: 1 from *Engineering Index*; 2-9 from *Paper and Board Printing and Packaging*; 10-17 from *Rubber & Plastic Research Abstracts*.

Dec. 19, 1997 computer search results listing titles and abstracts of citations numbered: 1-4 from *Paper and Board Printing and Packaging*; and 5-8 from *Rubber & Plastics Research Abstracts*.

Thomas R. Mueller, "Improving Barrier Properties of Polypropylene Films", *Journal of Plastic Film & Sheeting*, vol. 14, pp. 226-233 (1988).

William W. Cox and Edward K. Bullock, "Draw Stress Characterization of Polypropylene For Improved Biaxial Film Processability", pp. 397-415 (date unkown).

M.E. Gross and C.D. Weber, "Carboxylic Polymers In Adhesives", *Handbook of Adhesives*, 2 ed., pp. 331-342.

S. Sanchez-Valdes, I. Yanez-Flores, L.F. Ramos De Valle, O.S. Rodriguez-Fernandez, F. Orona-Villarreal and M. Lopez-Quintanilla, "Fusion Bonding of Maleated Polyethylene Blends to Polamide 6", *Polymer Engineering and Science*, vol. 38, No. 1, pp. 127-133 (1998).

DeBell & Richardson, Inc., "Status and Prospects Of Plastic Bottles In Food And Beverage Packaging", pp. 63-64 (1971).

Scott M. Hacker, "Not all Maleated Polyolefins are Created Equal", ANTEC '01 handout.

Moore, Edward P., Jr. *Polypropylene Handbook*, pp. 244 and 347.

\* cited by examiner

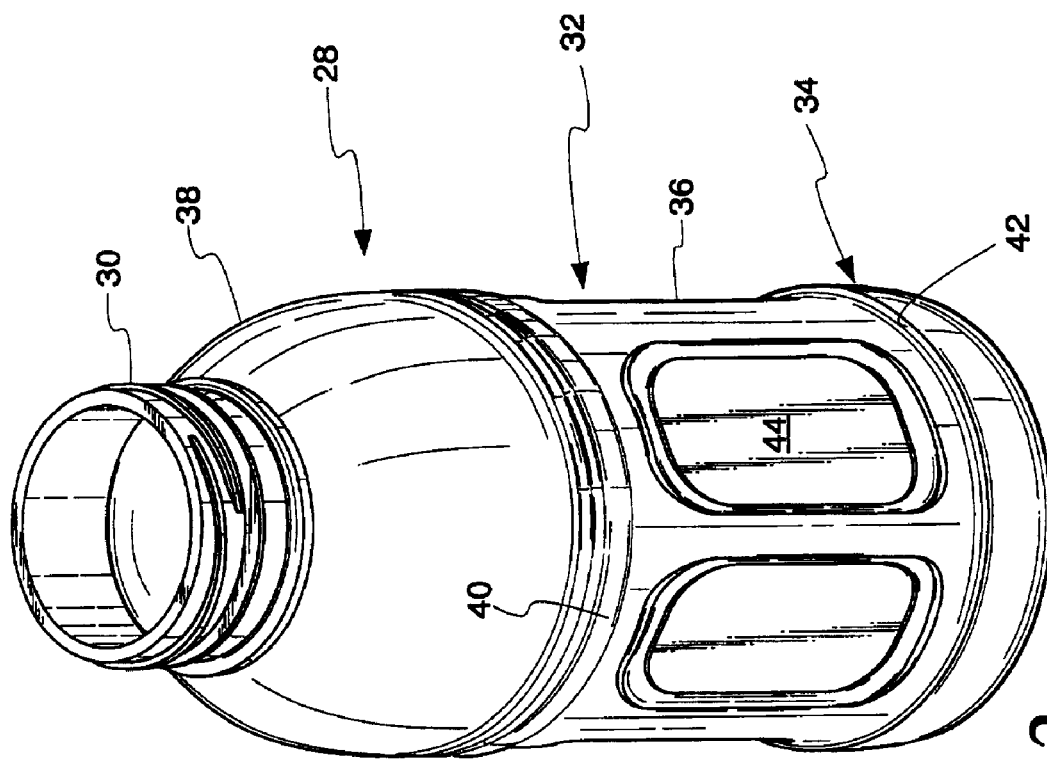
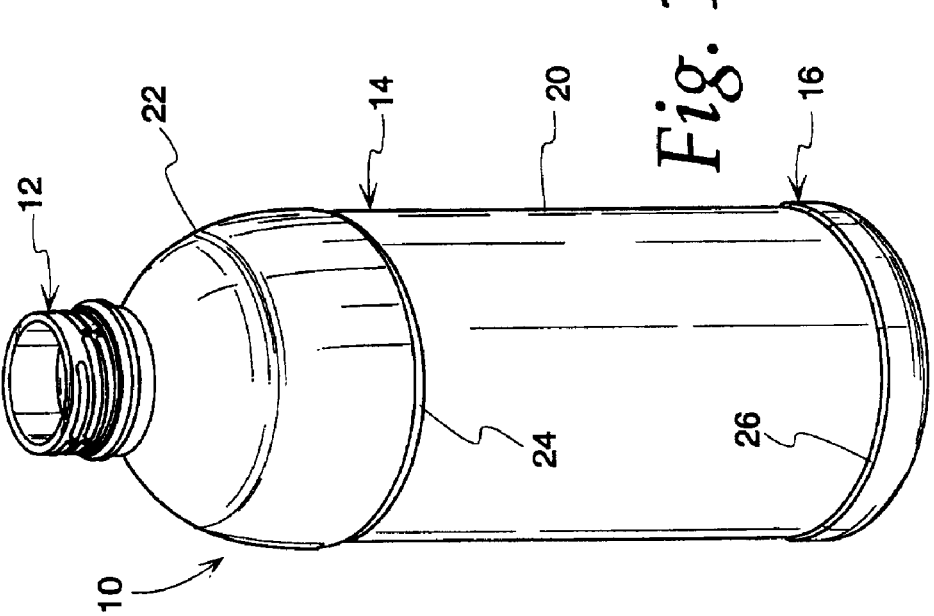

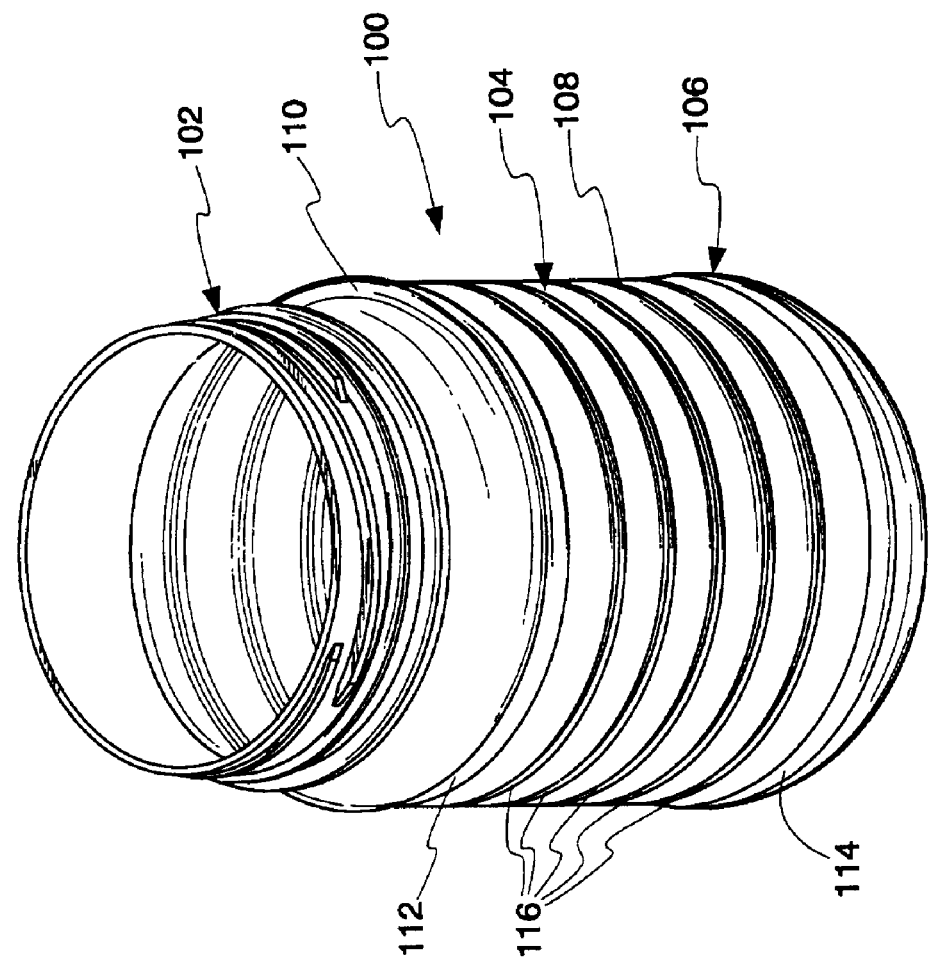
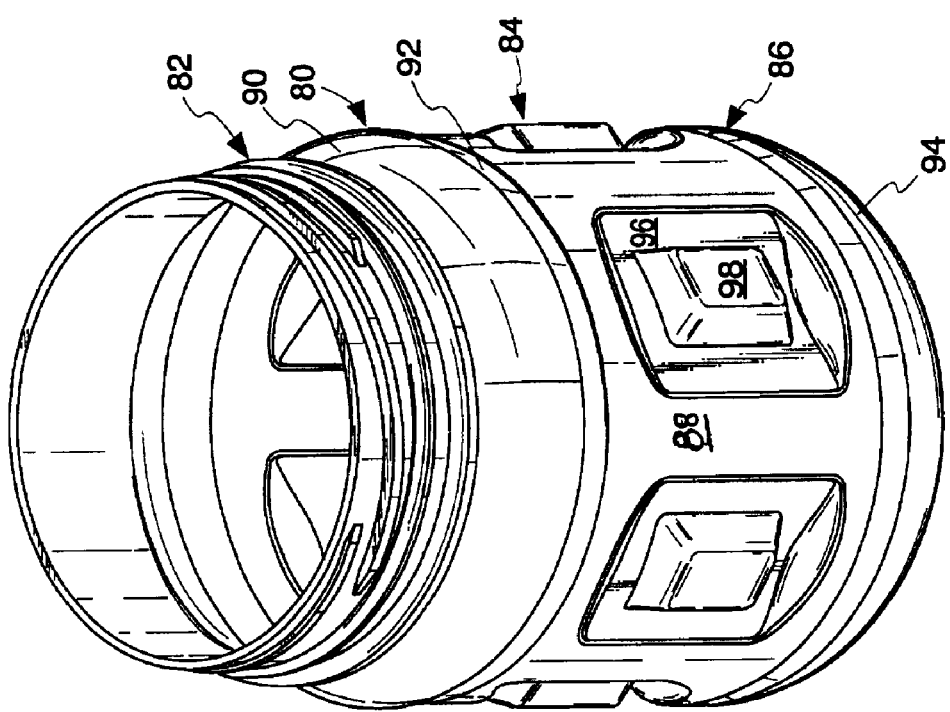
Fig. 5
Fig. 4B

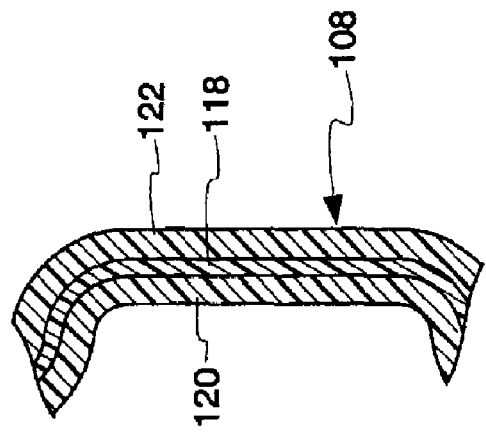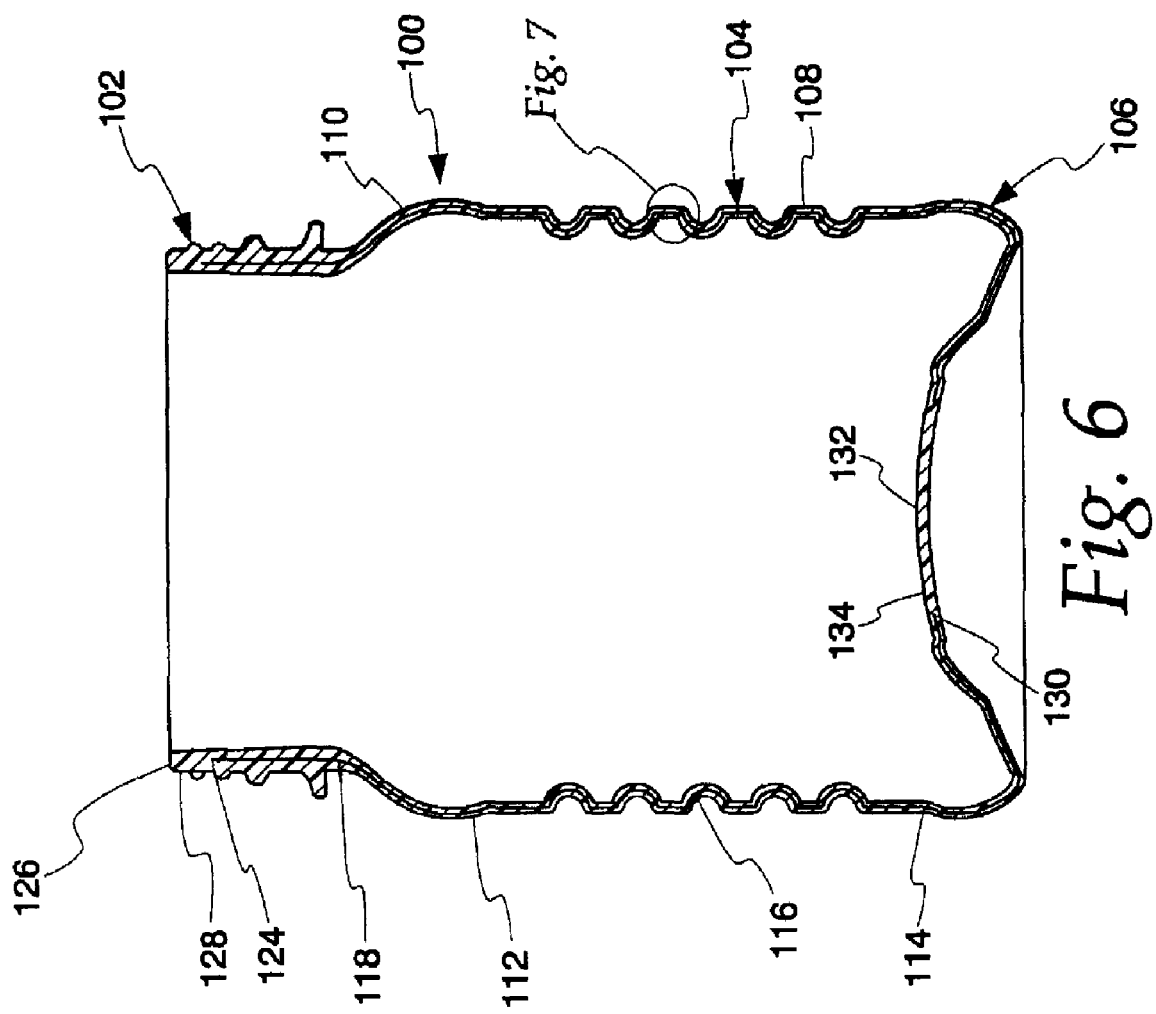

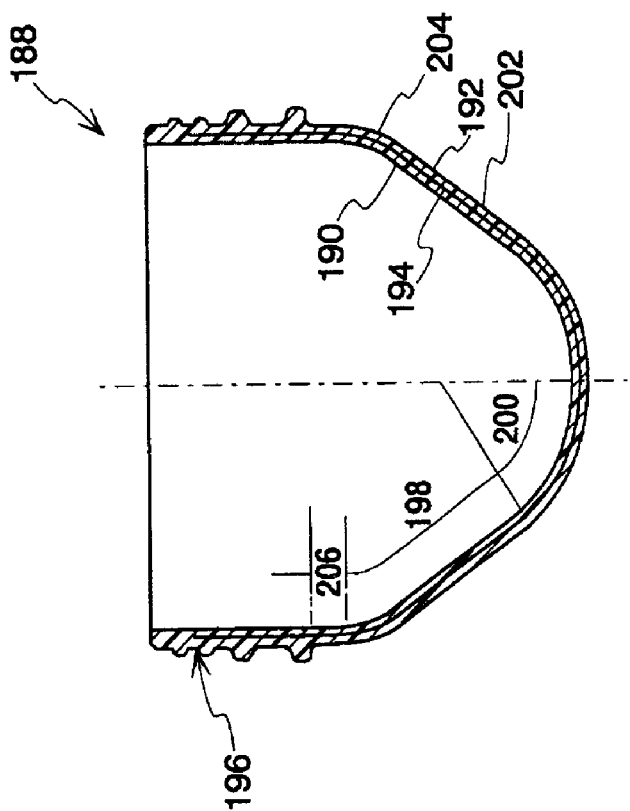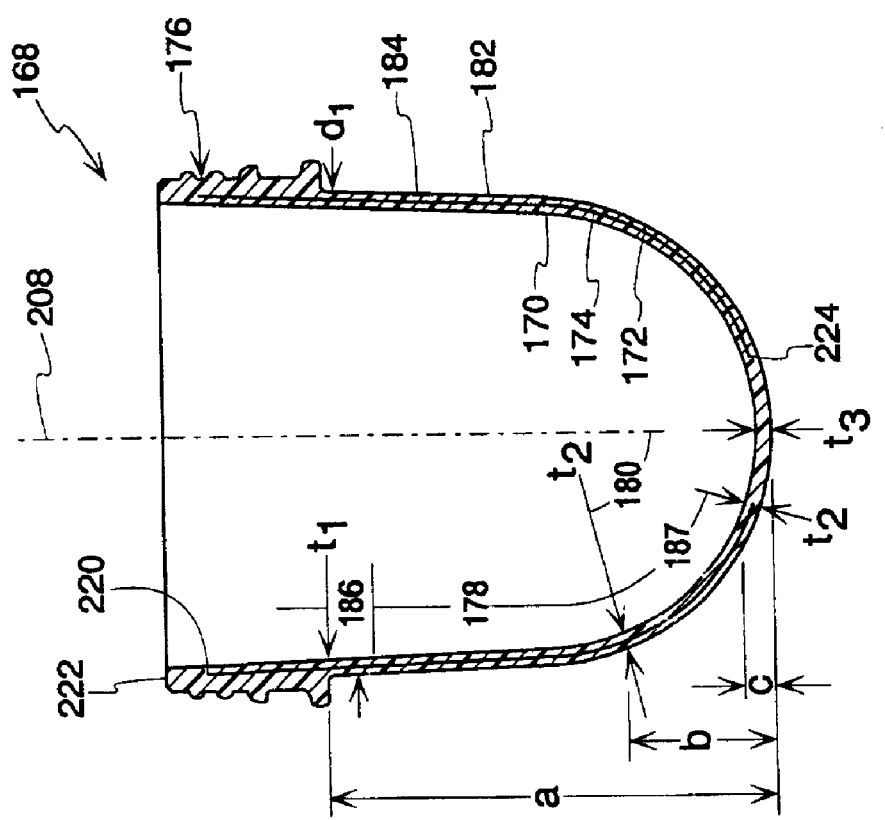

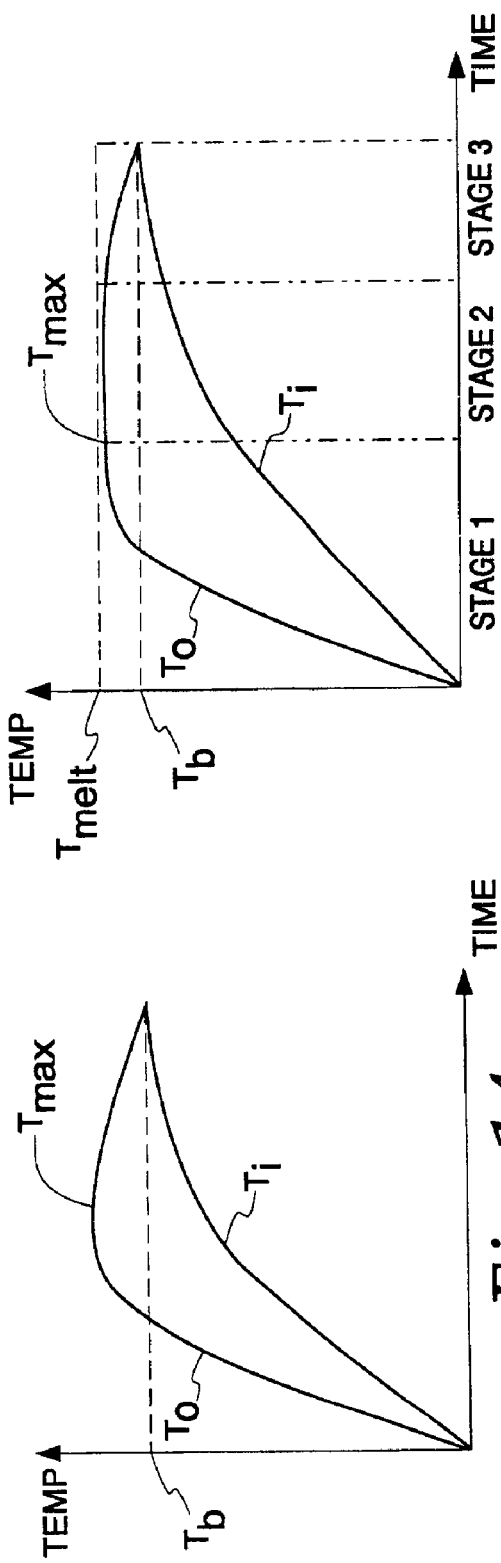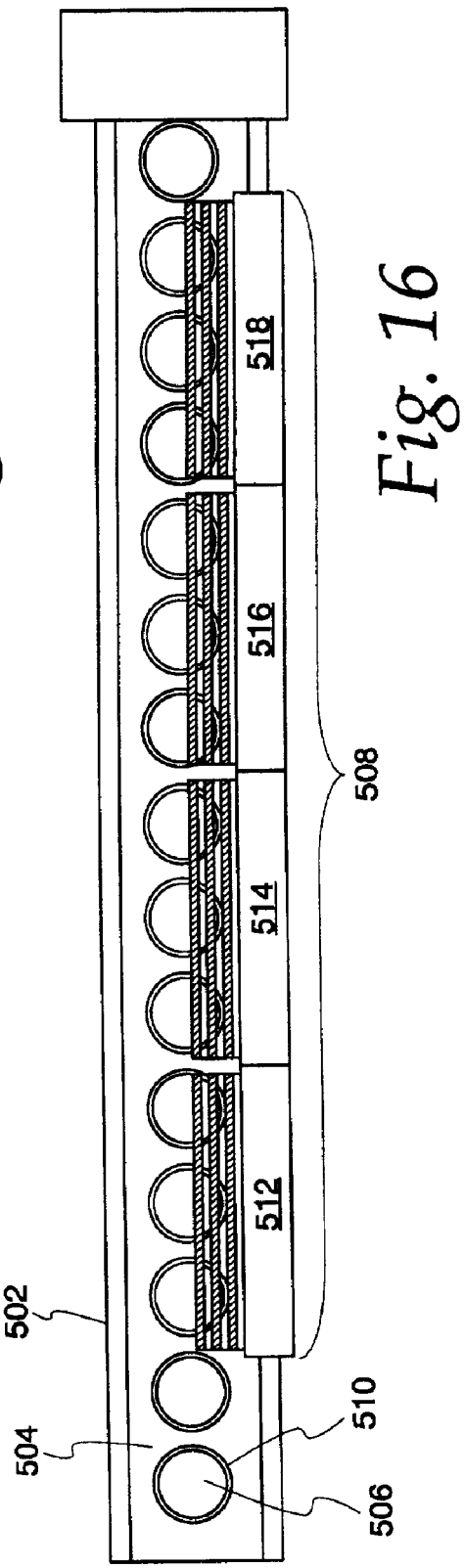

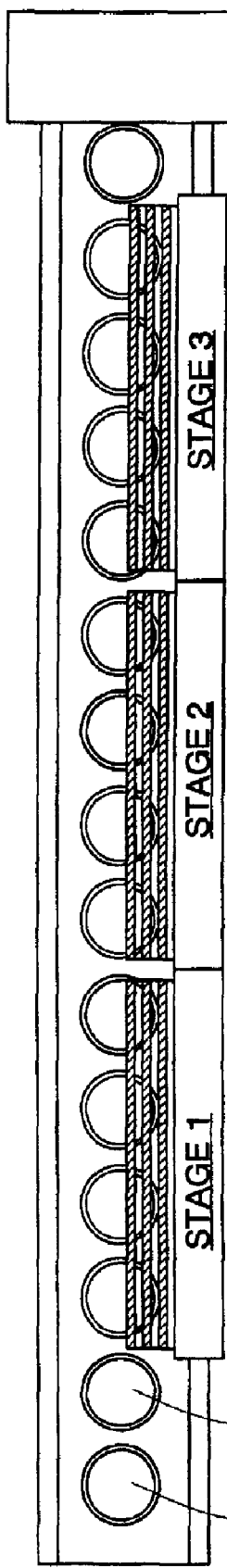
*Fig. 18*
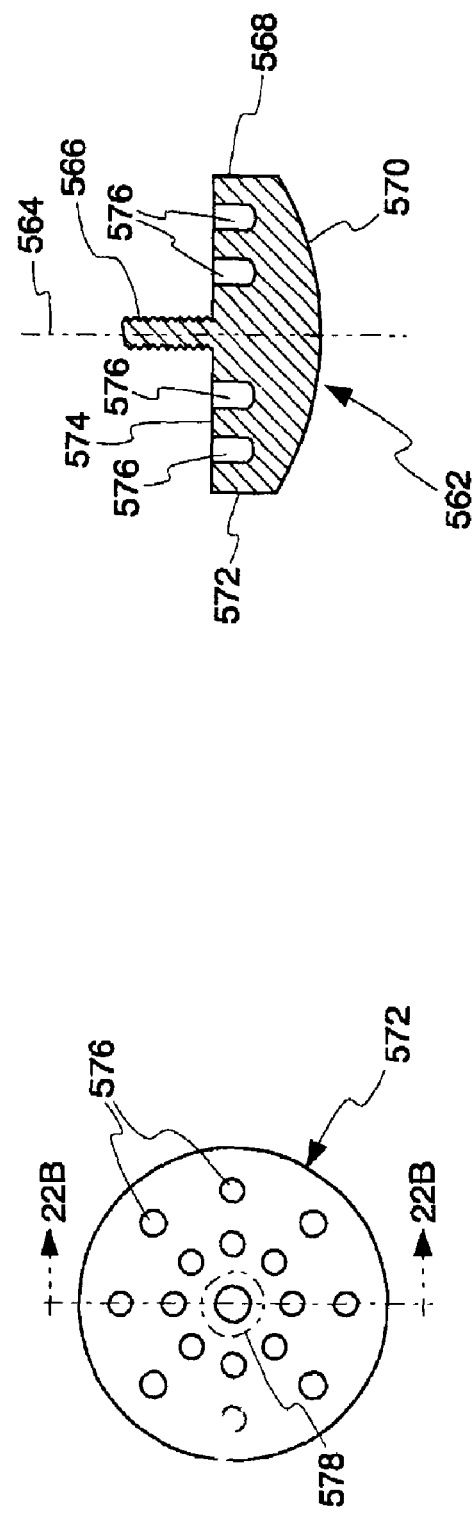
*Fig. 22B*
*Fig. 22A*

POLYPROPYLENE CONTAINER AND PROCESS FOR MAKING THE SAME

This is a continuation application of U.S. patent application Ser. No. 10/046,500 filed Oct. 24, 2001, now abandoned the content of which is hereby incorporated by reference in its entirety.

BACKGROUND OF THE INVENTION

1. Field of the Invention

This invention relates generally to oriented polymeric containers and processes for manufacturing the same; specifically, to oriented multilayer containers having at least one layer of polypropylene ("PP") and a layer of a barrier material providing a barrier to migration of oxygen, carbon dioxide, fragrance or flavor.

2. Background

Many products desirable of being stored in plastic containers have required a barrier to control migration of carbon dioxide, oxygen, fragrance, flavor, etc. in order to maintain product freshness. Such products included, by way of example only, certain carbonated beverages, fruit juices, beers, sauces, ketchups, jams, jellies and dry foods such as instant coffees and spices. Most commercially acceptable transparent or semi-transparent containers that provided carbon dioxide and oxygen migration control were constructed of at least one layer comprising a polyester such as polyethylene terephthalate ("PET") and a barrier layer comprising ethylene vinyl alcohol copolymer ("EVOH"), nylon or other known barrier material. The polyester layer deterred migration of moisture, although poorly so when compared to other polymers such as PP, while the barrier layer provided an excellent barrier to migration of carbon dioxide, oxygen, etc.

When biaxially oriented, PET has long been known to be stronger and have lower haze values than PP. PET has also been known to provide a better barrier to oxygen and carbon dioxide migration than PP. Containers have, nonetheless long been constructed of PP because PP provided a better barrier to moisture migration than PET. For example, PP has been used to construct extrusion blow molded multilayer containers having one or more PP layers and a barrier layer to provide a PP container with oxygen or carbon dioxide migration control. Such containers were only afforded the monoaxial orientation inherent in the extrusion blow molding process. Clarity of these bottles suffered accordingly. Monolayer biaxially oriented PP containers constructed by injection stretch blow molding or reheat stretch blow molding processes have also been employed to produce low haze oriented PP ("OPP") structures.

Historically, PP has been significantly cheaper to purchase as a raw material than has PET. PP has been known to better withstand the high temperatures associated with hot-fill products than has PET. PP has been known to have a lower glass transition temperature, is semi-crystalline and crystallizes at a lower temperature than PET. Additionally, PP has been known to have less built in strain than PET.

Beneficially, the melt temperature of most commercial grade PP has been known to be substantially lower than that of PET, bringing the PP melt temperature closer to that of EVOH. Unfortunately traditional PP did not readily bond to most commercially feasible barrier materials. Failure to bond a barrier layer to an adjacent structural layer (such as of PET or PP) was made obvious to the naked eye due to reflection or refraction of light and detracted from the clarity and aesthetics of a resulting structure. Known PP containers with barrier protection therefore employed a discrete layer of an adhesive agent between a barrier layer and each adjacent PP layer to assure interlayer adhesion. This discrete layer of adhesive agent significantly reduced the clarity (i.e. increased the haze value) of the container. Moreover, known PP containers having a barrier layer were restricted to extrusion blow molding and the mono-axial orientation afforded thereby. The mono-axial orientation afforded by extrusion blow molding left the PP with significantly higher haze values than its PET counterpart.

Having been burdened with the discrete layer of adhesive agent and being afforded only the monoaxial orientation of extrusion blow molding, known PP containers with barrier protection suffered from high haze values. Known PP containers with barrier protection have haze values of approximately 40-70%. Despite the advantages of PP, PET has, therefore, long been the material of choice for barrier containers when low haze was desired.

SUMMARY OF THE INVENTION

The present invention comprises a method and apparatus for constructing a structurally sound PP container with barrier protection having a low haze value. The present invention also comprises a preform for reheat stretch blow molding a PP container with barrier protection and a low haze value. It is one objective of the present invention to provide a container having a layer comprised of PP and a layer comprised of barrier material adjacent to the PP layer wherein an adhesive is incorporated into at least one of the PP layer and the barrier layer for bonding the PP layer directly to the barrier layer.

It is an additional objective of the present invention to provide multilayer plastic containers having oxygen, carbon dioxide and moisture barrier protection with a haze value of less than 25%.

It is another object of the present invention to provide containers having a layer of enhanced PP and a layer of a barrier material directly adjacent thereto.

It is another object of the present invention to provide containers having a layer of a PP and a layer of enhanced barrier material directly adjacent thereto.

It is another object of the present invention to provide a commercially acceptable, cost effective container with a low haze value having a layer comprising PP immediately adjacent to a layer comprising a barrier material.

It is still another object of the present invention to provide a barrier PP container having a haze value of less than 20%.

It is yet another object of the present invention to provide containers meeting the above objects of the invention and having a high structural integrity.

It is an additional object of the present invention to provide barrier PP containers meeting the above objects of the invention and having the high structural integrity necessary to withstand hot-filling of commercial food products.

It is yet another object of the present invention to provide barrier PP containers meeting the above objects of the invention and having the high structural integrity necessary to withstand conventional methods of sterilizing commercial food products.

It is a further object of the present invention to provide a preform having two different materials with similar melting temperatures to facilitate more compatible injection molding of the preform.

It is yet an additional object of the present invention to provide a barrier PP container having a low haze value.

It is a still another object of the present invention to provide a preform for blow molding a barrier PP container.

It is still a further object of the present invention to provide a preform having a thickness profile designed to facilitate the blow molding of a structurally sound barrier PP container.

It is a still another object of the present invention to provide a preform having a thickness profile designed to facilitate the blow molding of a structurally sound barrier PP container having vacuum panels, ribs or other structural reinforcing features.

It is an additional object of the present invention to provide a reheat process capable of heating a barrier PP preform to facilitate proper biaxial stretch blow molding of that preform into a commercially acceptable container.

It is still an additional object of the present invention to provide a reheat process capable of efficiently heating a barrier PP preform to an approximately uniform temperature to facilitate proper biaxial stretch blow molding of that preform into a commercially acceptable container.

It is yet another object of the present invention to provide a reheat process capable of efficiently heating a barrier PP preform to an approximately uniform temperature without elevating any portion of that preform above its melt temperature.

It is still further object of the present invention to provide a process for blow molding barrier PP containers on known blow molding equipment.

It is another object of the present invention to provide a process for blow molding barrier PP containers on blow molding equipment designed for blow molding PET.

It is still another object of the present invention to provide a blow molding stretchrod configured to be capable of high rates of heat convection.

It is yet another object of the present invention to provide a wide tipped blow molding stretchrod configured with fins, holes or other elements increasing its surface area and, therefore, its capability of high rates of heat convection.

BRIEF DESCRIPTION OF DRAWINGS

FIG. 1 is a perspective view of one container according to the present invention.

FIG. 2 is a perspective view of another container according to the present invention.

FIG. 4B is a perspective view of a further container according to the present invention.

FIG. 5 is a perspective view of still a further container according to the present invention.

FIG. 6 is a vertical cross-sectional view of the container of FIG. 5 taken through its longitudinal axis.

FIG. 7 is an out-take from the cross-sectional view of FIG. 6.

FIG. 12A is a vertical cross-sectional view of another preform constructed according to the present invention, taken through its longitudinal axis.

FIG. 12B is a vertical cross-sectional view of yet another preform constructed according to the present invention, taken through its longitudinal axis.

FIG. 14 depicts a temperature-time diagram for heating a monolayer PP preform according to the prior art.

FIG. 15 depicts a temperature-time diagram for heating a monolayer or multilayer PP preform according to one embodiment of the present invention.

FIG. 16 depicts a top-side elevational view of a heating apparatus for heating a PP preform according to one embodiment of the present invention.

FIG. 18 depicts an overhead view of another heating apparatus for heating a PP preform according to one embodiment of the present invention.

FIG. 22A is a back-side elevational view of the tip of the stretchrod depicted in FIG. 21.

FIG. 22B is a cross-sectional view of the tip of the stretchrod depicted in FIG. 21.

DETAILED DESCRIPTION OF THE DRAWINGS

Figure 4A:
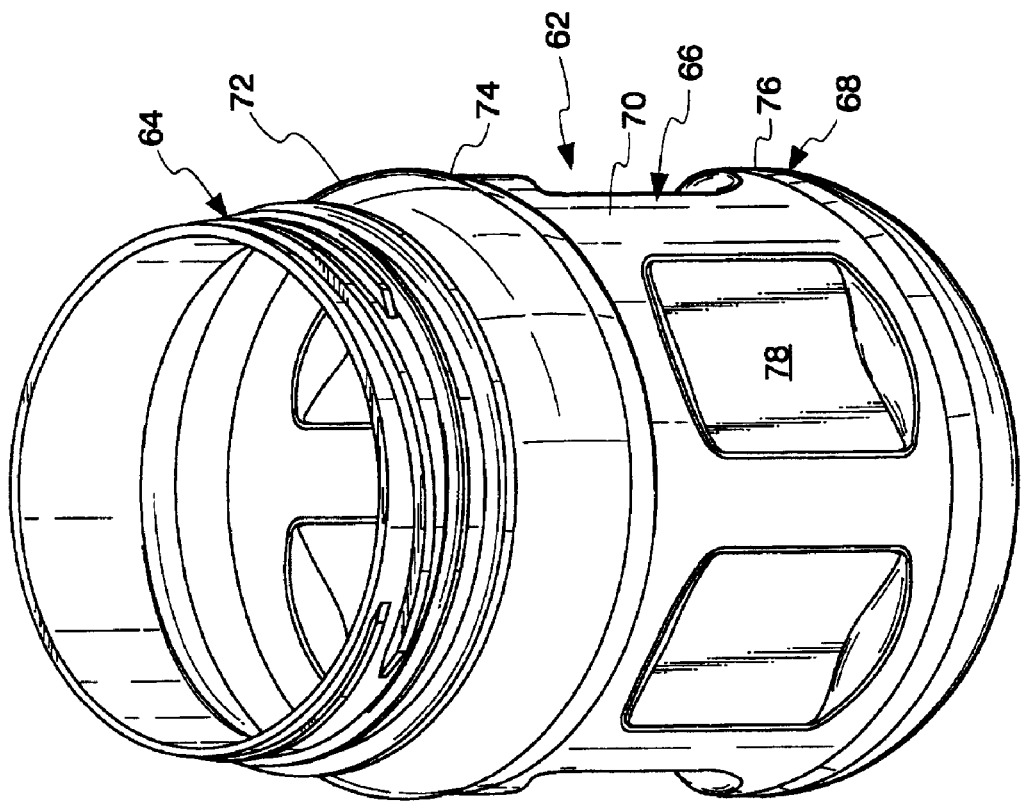
FIG. 4A is a perspective view of still another container according to the present invention.

It has been found that the barrier PP container of the present invention can be achieved by reheat stretch blow molding a container from a multilayer preform comprising at least one layer of PP and at least one layer of barrier material. The terms barrier, barrier material or barrier layer shall mean the use of EVOH, nylon or other known polymeric material know to provide a barrier to migration of oxygen, carbon dioxide, fragrance or flavor including, but not limited to, those materials having nano-composites or other non-polymeric materials known to inhibit the migration of gases or materials known to absorb or "scavenge" gases such as oxygen. When generically referenced herein, PP shall mean any of PP homopolymers, random copolymers, block copolymers or random block polymers. A comonomer can be selected from the group consisting of ethylene, butylene, or other alpha-olefins from $C_5$-$C_8$. A preferred comonomer is ethylene wherein the ethylene is up to 3.0 weight % of the polypropylene copolymer. The incorporation of nucleating agents (often referred to as "clarifiers" or "clarifying agents") into the PP for reducing the haze value, as known to those of ordinary skill in the art, is also contemplated. Clarifying agents are exemplified by Milliken Chemical, Division of Milliken & Co.'s Millad 3988 clarifying agent or Mitsui Toatsu Chemicals, Inc.'s NC4 clarifying agent. Other clarifiers such as sorbitol and benzoates can also be used. Such clarifying agents are typically present in the amount of 0.1-0.3% by weight of the PP. Commercially available materials that have been found to readily facilitate the present invention are discussed herein by way of example and are not intended to limit the scope of the invention.

FIG. 1 depicts one embodiment of a multilayer plastic container 10 biaxially oriented according to the present invention. The container 10 is depicted in the form a bottle having a narrow finish 12, a body portion 14 extending from the finish 12 to a base 16 with the body 14 defining a cylindrical wall 20 and a shoulder 22. The cylindrical wall 20 has an upper label protector 24 and a lower label protector 26 to prevent an adjacent container from damaging a label (not shown) on the cylindrical wall 20. The container 10 could be employed, for example, to deliver water, fruit juices or carbonated or other beverages. Various other container configurations, such as those discussed below, are also susceptible of construction according to the present invention.

FIG. 2 depicts another container embodiment 28 according to the present invention. The container 28 has a wide-mouth finish 30, a body portion 32 extending from the finish 30 to a base 34 with the body 32 defining a cylindrical wall 36 and a shoulder 38. The cylindrical wall 36 has an upper label protector 40 and a lower label protector 42. The container 28 is depicted in the form of a wide-mouth bottle having vacuum panels 44, often referred to as windows, to strengthen the cylindrical wall 44 against buckle due to low pressure in the container 28 resulting from processes such as hot-filling or warm-filling, as will be understood by one of ordinary skill in the art, typical of filling processes employed for fruit juices. The windows 44, or other known support features, may be of any known configuration. The configuration of container 28 is more fully disclosed in U.S. Pat. No. D445,693S, the entirety of which is incorporated herein by reference.

Figure 3:
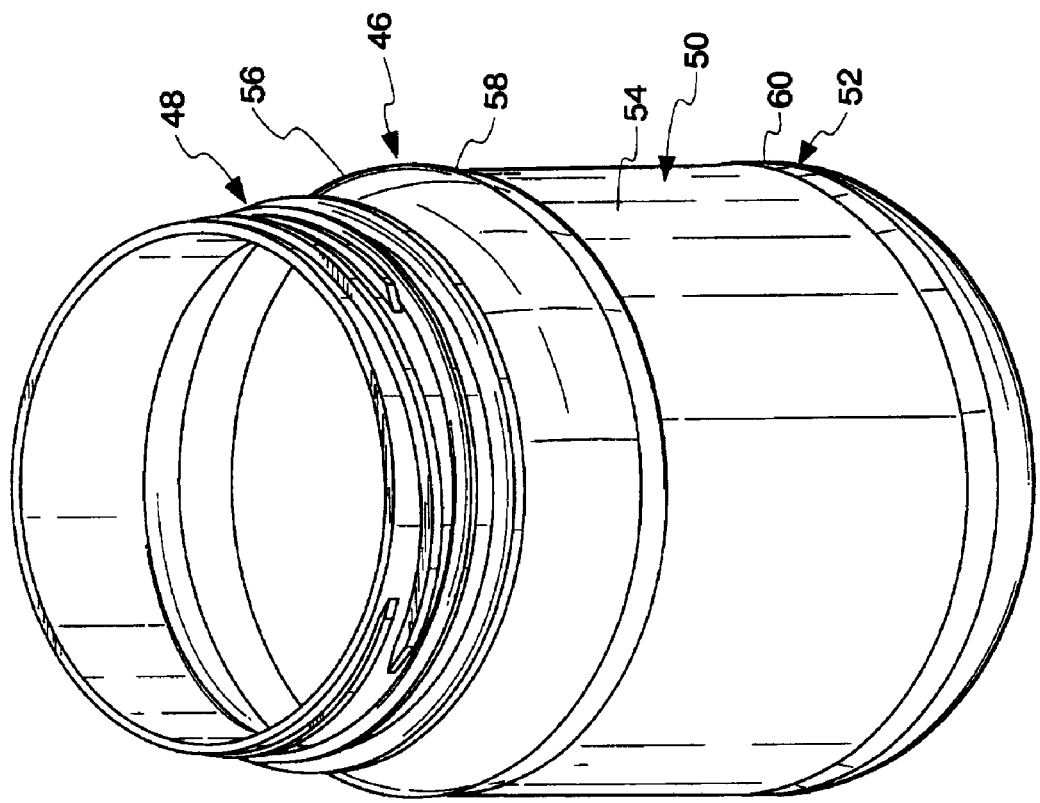
FIG. 3 is a perspective view of yet another container according to the present invention.

FIG. 3 depicts yet another container embodiment 46 according to the present invention. The container 46 is representative of a typical wide-mouth jar configuration. The container 46 has a wide-mouth finish 48, a body portion 50 extending from the finish 48 to a base 52 with the body 50 defining a cylindrical wall 54 and a shoulder 56. The cylindrical wall 54 has an upper label protector 58 and a lower label protector 60. The container 46 is depicted in the form of a wide-mouth jar typically employed for products such a jams and jellies, red sauces and dry goods such as ground coffees.

The containers of FIGS. 4A, 4B and 5 depict container configurations similar to that of the container 46 depicted in FIG. 3 with the addition of support features to reinforce the respective sidewalls against buckle under vacuum. FIG. 4A depicts a container embodiment 62 having a wide-mouth finish 64, a body portion 66 extending from the finish 64 to a base 68 with the body 66 defining a cylindrical wall 70 and a shoulder 72. The cylindrical wall 70 has an upper label protector 74 and a lower label protector 76. The container 62 is depicted in the form of a wide-mouth jar having vacuum panels 78. The vacuum panels 78, or other known support features, may be of any known configurations. The configuration of container 62 is more fully disclosed in U.S. Pat. No. D445,339S, the entirety of which is incorporated herein by reference. FIG. 4B depicts a container embodiment 80 having a wide-mouth finish 82, a body portion 84 extending from the finish 82 to a base 86 with the body 84 defining a cylindrical wall 88 and a shoulder 90. The cylindrical wall 88 has an upper label protector 92 and a lower label protector 94. The container 80 of FIG. 4B is depicted in the form of a wide-mouth jar having vacuum panels 96 similar to vacuum panels 78 of the container depicted in FIG. 4A, with the addition of islands 98 to further strengthen the cylindrical wall 88, as known in the art, as well as provide support for a label (not shown) placed on the cylindrical wall 88. The vacuum panels 96 and islands 98, or other known support features, may be of any known configurations.

FIG. 5 depicts a container embodiment 100 having a wide-mouth finish 102, a body portion 104 extending from the finish 102 to a base 106 with the body 104 defining a cylindrical wall 108 and a shoulder 110. The cylindrical wall 108 has an upper label protector 112 and a lower label protector 114. The container 100 is depicted in the form of a wide-mouth jar having annular ribs 116 to strengthen the cylindrical wall 108, as known in the art. The annular ribs 116, may be of any number or known configurations. The configuration of container 100 is more fully disclosed in U.S. patent application Ser. No. 29/119,063, the entirety of which is incorporated herein by reference.

The containers depicted in FIGS. 1-5 each represent an alternative to containers of like configurations constructed of PET and may optionally be provided with barrier protection from one or more barrier layers. The container configurations contemplated as susceptible of being constructed from OPP according to the present invention are limitless and the scope of the invention is not limited to those container configurations depicted herein. Rather, the containers of FIGS. 1-5 are depicted to indicate the broad range of capabilities that can be achieved with containers constructed according to the present invention. For example, despite all of the containers depicted, and described herein, being of cylindrical configuration, non-cylindrical containers may also be constructed according to the present invention and the same principals discussed herein in relation to the construction of cylindrical containers also apply to non-cylindrical containers.

Barrier PET containers have become the industry standard for manufacturers of oxygen sensitive consumer goods who wish to provide their products in transparent or semi-transparent (collectively referenced herein as "low haze") barrier containers. The barrier OPP containers of the present invention provide a relatively inexpensive alternative to barrier PET. Due in part to the stability of PP at relatively high temperatures, as compared to PET, the containers of the present invention are ideally suited for high heat processing such as for purposes of sterilization. For example, as discussed above, the present invention has been found to produce containers capable of withstanding hot-filling at standard parameters. It is also contemplated that containers manufactured according to the present invention are well suited for other methods known in the art for sterilizing consumer products, such as, by way of example, pasteurization and retort.

The advantages of the present invention also extend to consumer goods not requiring heat treatment. For example, injection of the multilayer preforms of the present invention is simplified over injection of their PET counterpart, because the injection temperature of PP (typically ranging from approximately 200-220° C.) is close to that of EVOH (typically ranging from approximately 190-210° C.), the barrier material of one embodiment of the invention. Therefore, the injection equipment employed to construct preforms according to the present invention need not be designed to maintain a significant temperature differential between those melt materials. Moreover, all containers of the present invention will benefit from the relatively low cost of PP as compared to PET while achieving comparable haze values and overall aesthetics.

Interlayer Construction

FIG. 6 depicts a cross-sectional view of the container 100 depicted in FIG. 5. The various wall constructions set forth below can apply equally well to other container configurations contemplated by the present invention, whether or not depicted herein. Moreover, it is contemplated that the present invention may apply to all multilayer PP containers, with or without a barrier layer. Accordingly, the terms "intermediate layer" will be used herein to generically refer to a layer positioned intermediate of two PP layers in a preform or container and may, although it need not, comprise a barrier layer. It is also contemplated that each preform or container configuration described or shown herein may be supplied with a non-barrier intermediate layer in the place of the barrier layer discussed.

As depicted in FIG. 6, a barrier layer 118 extends throughout the body portion 104 and into both the finish 102 and the base 106. For the clarity of FIG. 6, the barrier layer 118 is represented by a single line rather than depicted with a thickness having cross-hatching. The respective barrier layers of FIGS. 11, 12A-B, 13A-B, 17, 19A-D, 20 and 21 are likewise represented by a single line. The barrier layer 118, where present, divides the container 100 into an inner layer 120 and an outer layer 122. FIG. 7 depicts an out-take of the wall 108 to provide an enhanced view of the multi-layer structure. The inner layer 120 and the outer layer 122 are each preferably comprised of the same material composition to simplify the equipment necessary for injecting preforms from which the container 100 is blown. It is contemplated, however, that the material compositions of the inner and outer layers 120 and 122 could differ one from the other such as, by way of example only, incorporating a clarifying agent into only the outer layer 122.

The inner and outer layers 120 and 122 comprise at least PP and provide a majority of the thickness and structural rigidity to the bottle 100, and, as such, may be referenced herein as "structural layers." The barrier layer 118 is comprised of at least a barrier material or as discussed generally above and more specifically below. The material compositions of the layers 118, 120 and 122 facilitate adhesion, bonding or tying between each of the structural layers 120 and 122 and the barrier layer 118 to prevent delamination of the container 100 under normal conditions. Reference herein to any one of the terms "adhesion," "bonding" or "tying" may, alternatively, represent reference to any of the others where not inconsistent.

In one embodiment, the polymer structure of either the PP or the barrier material is modified from known compositions to facilitate adhesion between the two materials in a process often referred to as "compatiblizing" one polymer with the other. In an alternative embodiment, an adhesive is incorporated into the material of at least one of the barrier layer 118 and the structural layers 120 and 122. For example, the structural layers 120 and 122 may comprise a PP with an adhesive incorporated therein while the barrier layer 118 is comprised of a pure barrier material. Alternatively, the structural layers 120 and 122 may comprise pure PP while the barrier layer 118 is comprised of a barrier material with an adhesive incorporated therein. In yet another alternative embodiment, each of the layers 118, 120 and 122 could incorporate an adhesive to facilitate adhesion therebetween. A PP that has been compatiblized or made to incorporate an adhesive will be referred to herein as "enhanced PP" or an "enhanced PP layer." A barrier material that has been compatiblized or made to incorporate an adhesive will be referred to herein as an "enhanced barrier material," "enhanced barrier layer," or "enhanced EVOH" or "enhanced nylon" when material specific.

One embodiment of an "enhanced PP" comprises blending, for example by dry blending, Tymor 2E02 adhesive agent (manufactured by Rohm and Haas) into Solvay KB 4285 PP (referenced herein as "Solvay 4285") as a base PP to disperse the Tymor 2E02 throughout the base PP as evenly as possible. Tymor 2E02 comprises a PP functionalized with a maleic anhydride in the amount of approximately 0.2% by weight. Tymor 2E02 is dispersed throughout the base PP in the amount of up to approximately 15% by weight to provide the enhanced PP with up to approximately 0.03% by weight of maleic anhydride. The Tymor 2E02 PP onto which maleic anhydride is grated, can be any known PP. However, when used in concentrations over approximately 10% by weight, it is preferred, although not necessary, that the Tymor 2E02 comprise the same PP as the base PP into which it is to be incorporated.

Another embodiment of an "enhanced PP" comprises blending, for example by dry blending, Tymor 2E04 adhesive agent (manufactured by Rohm and Haas) into Solvay 4285 PP as a base PP to disperse the Tymor 2E04 throughout the base PP as evenly as possible. The Tymor 2E04 comprises a PP functionalized with a maleic anhydride in the amount of approximately 0.8% by weight. The Tymor 2E04 is dispersed throughout this base PP in the amount of up to approximately 15% by weight to provide the enhanced PP with up to approximately 0.12% by weight of maleic anhydride. As with the Tymor 2E02, the Tymor 2E04 PP onto which the maleic anhydride is grafted can be any known PP. However, when used in concentrations over approximately 10% by weight, it is preferred, although not necessary, that the Tymor 2E04 comprise the same PP as the base PP into which it is to be incorporated.

A further embodiment of an "enhanced PP" comprises blending, for example by dry blending, Fusabond 353D (manufactured by DuPont) adhesive agent into Solvay 4285 PP as a base PP to disperse the Fusabond 353D throughout the base PP as evenly as possible. The Fusabond 353D comprises a PP functionalized with a maleic anhydride in the amount of approximately 1.0% by weight. The Fusabond 353D is dispersed throughout this base PP in the amount of up to approximately 5% by weight to provide the enhanced PP with up to approximately 0.05% by weight of maleic anhydride. The Fusabond 353D base PP can be any known PP.

The invention also contemplates the incorporation of alternative adhesives agents into a base PP. For example, the following adhesive agents have been found to provide acceptable adhesion between a base PP and a barrier material when employed to create an enhanced PP: Fusabond 411D and Fusabond 536D (both manufactured by DuPont); and Tymor 2E07 (manufactured by Rohm and Haas). The identified adhesive agents are not intended to represent an exhaustive list of possible adhesive agents and others not mentioned here are contemplated.

Although any barrier material may be employed in a barrier layer of the present invention several barrier materials have been found to readily adhere to an adjacent enhanced PP layer, especially when the PP is enhanced with one of the above-identified adhesive agents. These barrier materials are: F-104BW EVOH, XEP-561 EVOH, XEP-719 EVOH, XEP-721 EVOH and ETC-127 EVOH (all manufactured by Evalca); Soarus D2908 EVOH and Soarus SG430 EVOH (all manufactured by Soarus); Grivory G21 nylon (manufactured by EMS-Chemie); and type 6001 MxD6 nylon (manufactured by Mitsubishi Gas Chemical). These agents are listed by way of example only and other barrier materials are contemplated.

One embodiment of an "enhanced barrier layer" comprises blending, such as by dry blending, Tymor 2E02 adhesive agent into F-104BW EVOH as a base barrier material to disperse the Tymor 2E02 throughout the base barrier material as evenly as possible. As set out above, the Tymor 2E02 comprises maleic anhydride in the amount of approximately 0.2% by weight. The Tymor 2E02 is dispersed throughout this base barrier material in the amount of up to approximately 15% by weight to provide the base barrier material with up to approximately 0.03% by weight of maleic anhydride.

In one embodiment, adhesive agents that require a smaller concentration of the adhesive agent within the base barrier material are preferred adhesive agents for an enhanced barrier layer. The adhesive agents themselves typically being poor barriers to oxygen, carbon dioxide, etc., it is believed that the adhesive agent, when integrated into the barrier material, deteriorates the barrier capabilities of the barrier material by reducing the thickness of the barrier material, or even effectively poking holes in the barrier layer, wherever chains of the adhesive agent are located in the barrier layer. By way of example, the Tymor 2E04 has a higher concentration of maleic anhydride than the other listed adhesive agents and it requires less non-barrier material in the barrier layer than, for example, Tymor 2E02 to provide the same amount of maleic anhydride.

As used herein to describe the incorporation of a commercial adhesive agent such as Tymor 2E02 into a base material such as Solvay 4285 PP, the term "dry blending" refers to dispersing pellets of each into the extruder of the injection apparatus to be melted together as they are advanced through the extruder. Blending in this manner results in chains of the commercial adhesive agent entangled in the chains of the base PP as will be understood by those of ordinary skill in the art. When the adhesive agent comprises maleic anhydride grafted onto PP, the adhesive agent may also be referred to as maleated PP. Blending in this manner may also be employed to incorporate an adhesive agent into a base barrier material. Other methods of incorporating an adhesive agent into a base material (be it PP or barrier material) are contemplated and will be evident to one of ordinary skill in the art.

In one embodiment of the present invention, the concentration of the adhesive agent within each of the structural layers 120 and 122 could decrease from a higher concentration at the extremity of each respective layer immediately adjacent to the barrier layer 118, to a lower (or zero) concentration at the extremity of the layer opposite the barrier layer 118.

It has been found that the greater the percentage of adhesive agent evenly distributed throughout any layer of the container 100, the better that layer will adhere to an adjacent layer. This correlation results from two facts. First, the adhesive force that an enhanced layer may exert on an adjacent layer of a container depends, at least in part, upon the amount of adhesive agent available at the outer surface of that enhanced layer to interact (i.e. adhere, bond or tie) with the adjacent layer. Second, as the percentage of adhesive agent evenly distributed throughout any layer is increased, the amount of adhesive agent which will be exposed at an outer surface of that layer will also necessarily increase. Additionally, the percentage of the adhesive agent in a layer which is exposed at the outer surface thereof, is inversely proportional to the thickness of that layer. That is, a thinner enhanced layer will produce greater adhesive potential from a given quantity of an adhesive agent, than will a relatively thicker enhanced layer comprised of the same given quantity of adhesive agent. From the foregoing it will be understood that because the barrier layer 118 of the container 100 is thinner than each of the inner and outer layers 120 and 122, dispersing an adhesive agent in the barrier layer 118 will necessarily decrease the amount of adhesive agent necessary to bond the inner and outer layers 120 and 122 to the barrier layer 118 relative to the dispersing the adhesive agent within the inner and outer layers 120 and 122.

Returning to the embodiment of FIG. 6, the barrier layer 118 terminates at a finish end 124 short of an uppermost extremity 126 of the finish 102 leaving a ring 128 of enhanced PP about the uppermost extremity 126 of the finish 102. As is known to one of ordinary skill in the packaging art, extending the barrier 118 to the uppermost extremity 126 of the container finish 102 would completely detach the inner layer 120 from the outer layer 122 and allow rather easy separation of the inner and outer layers 120 and 122. Separation of the inner and outer layers 120 and 122 from the barrier layer 118 at the finish 102 would become likely because only the adhesive agent would be left to maintain the structural layers 120 and 122 laminated to the barrier 118. Delamination at the finish 102 would provide an aesthetically unpleasing container and expose the barrier layer 118 to moisture which, in the case of EVOH for example, dramatically reduces the barrier layer resistance to migration of oxygen. Moreover, if the container were intended to facilitate human consumption directly from the container, separation of the layers at the upper extremity of the finish could result in injury to a consumer. The barrier layer 118 also terminates at a base end 130 short of the injection gate area at the center 132 of the base 106 leaving a disc 134 of enhanced PP about the base center 132. As will be understood by one of ordinary skill in the art, the disc 134 pins the structural layers 120 and 122 one to the other and helps to prevent delamination from initiating in the base 106. However, a barrier layer extending continuously across the entire base 106 is also contemplated by the present invention.

While it is desirable to locate the barrier layer 118 short of the finish uppermost extremity 126 and the base center 132 to prevent delamination, the portions of the container left absent of barrier material are subject to relatively undeterred oxygen migration due to the low oxygen barrier properties of known PP. Accordingly, it is desirable to place the barrier layer finish end 124 close to the finish uppermost extremity 126 and the barrier layer base end 130 close to the base center 132 to assist in maintaining lamination without creating an unnecessarily large area of the container through which oxygen will readily migrate. It has been found that placing the barrier finish end 124 within 0.100 inches (0.254 cm) from the finish uppermost extremity 126 meets the described goals. As understood by those of ordinary skill in the art, placement of the barrier layer ends 126 and 130 is dictated and controlled by the specific parameters employed in the process of injecting the preform from which the resulting container is blow molded. By way of example only, the barrier layer finish end 124 can be brought within a few mils of the finish uppermost extremity 126 by creating a barrier fold-over during injection as described in U.S. Pat. No. 4,554,190, the entirety of which is incorporated herein by reference. Other injection techniques to accomplish the discussed barrier placement will become evident to one of ordinary skill in the art.

The PP of the inner and outer layers 120 and 122 provide structural rigidity and moisture barrier protection to the container 100. The thickness of the inner and outer layers 120 and 122 and the thickness of the barrier layer 118 are designed according to factors such as the type of product to be filled in the container, the sensitivity of the product to oxygen, the desired shelf life of the product and whether or not the container will be hot-filled or subjected to other sterilization processes such as retort, etc. Typically the thickness of the inner and outer layers 120 and 122 are in the range of between approximately 0.005-0.015 inches (0.0127-0.0381 cm) each for typical consumer goods applications and the barrier layer thickness is typically between approximately 0.0001-0.002 inches (0.000254-0.00508 cm) for such applications. However, these thicknesses may be modified to vary, for example, the container's rigidity, moisture barrier and/or oxygen and carbon dioxide barrier as will be recognized by one of ordinary skill in the art. Layer thicknesses are discussed further below with specific examples in reference to FIG. 13A.

The present invention is not limited to the three layer wall structures described hereinabove. Accomplishing adhesion between two adjacent layers by incorporating an adhesive agent into at least one of those layers may be applied to other wall structures as well. For example, a two layer container (not depicted) is contemplated as having an innermost layer of PP adhered to an outer layer of barrier material wherein either the PP or the barrier material is enhanced, according to the present invention, with an adhesive agent. This structure is beneficial when employing a barrier material that is not as sensitive to moisture as some barrier materials, such as EVOH, and is resistant to flaking or chipping when subjected to the normal rigors of a consumer good container.

Alternatively, another two layer container (not depicted) is contemplated as having an innermost layer of barrier material and an outer layer of PP wherein either the barrier material or the PP is enhanced, according to the present invention, with an adhesive agent. This structure is beneficial for packaging consumer products, such as, by way of example only, orange juice that tend to have certain flavor components absorbed by many PP compositions, because the barrier material can act as a barrier to the migration of the flavor component. Conversely, the innermost barrier layer can act as a barrier to the migration of components of the PP layer, or an adhesive agent therein, into the packaged product.

Figure 9:
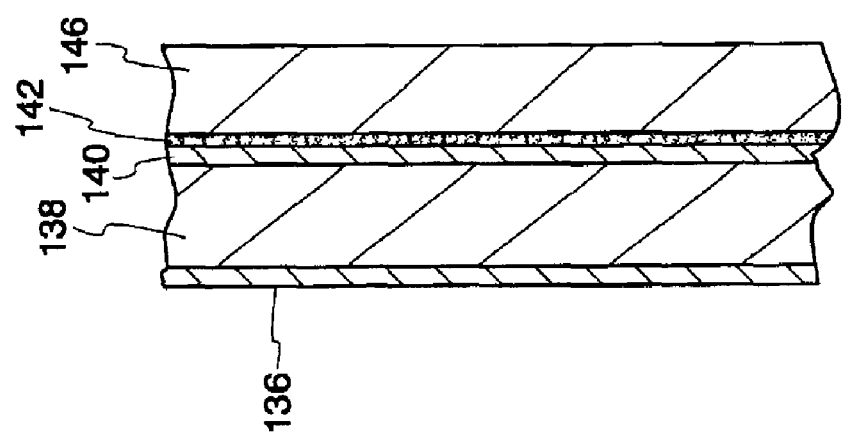
FIG. 9 is an out-take of a cross-section of another alternative wall construction according to the present invention.
Figure 8:
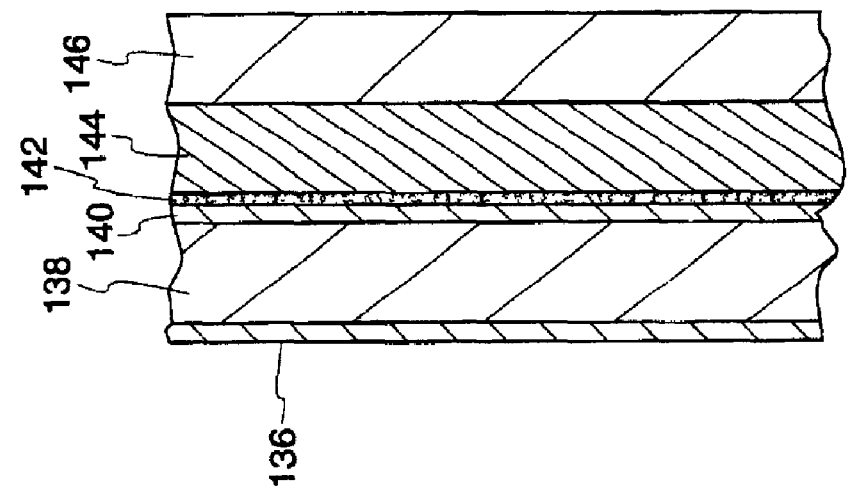
FIG. 8 is an out-take of a cross-section of an alternative wall constructed according to the present invention.

Adhering two adjacent layers one to the other according to the present invention can also be applied to more complicated structures including those constructed by extrusion blow molding techniques such as those described in U.S. Pat. No. 5,156,857, the entirety of which is incorporated herein by reference. For example, FIG. 8 depicts an outtake from the wall of six-layer container (container not depicted) comprising an innermost layer of barrier material 136 immediately adjacent to an inner layer of PP 138 which is, in turn, immediately adjacent to an intermediate layer 140 of barrier material. The intermediate layer 140 of barrier material is adhered by a discrete adhesive layer 142 to a regrind layer 144. An outermost layer of virgin PP 146 covers the regrind layer 144. The outermost layer 146 and the regrind layer 144 adhere to one another without the assistance of an adhesive agent as will be recognized by one of ordinary skill in the art. Discrete adhesive layer 142 is a traditional layer of adhesive, such as pure Tymor 2E02, as is known in the art. The inner layer of PP 138 between the innermost layer of barrier material 136 and the intermediate layer 140 of barrier material comprises an enhanced PP to provide lamination to the two adjacent barrier layers 136 and 140. The inclusion of regrind layer 144 renders this embodiment of the invention ripe for manufacture by standard extrusion blow molding processes known to those of ordinary skill in the art. FIG. 9 depicts another wall construction of the present invention which comprises the wall construction depicted in FIG. 8 without the regrind layer 144. The wall construction of FIG. 9 lends itself to reheat stretch blow molding which creates no scrap and, therefore, has no need for the regrind layer 144.

Figure 10:
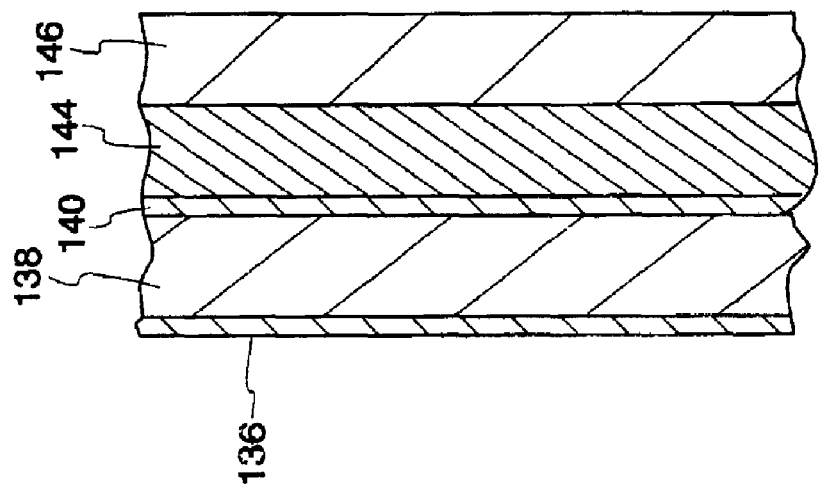
FIG. 10 is an out-take of a cross-section of yet another alternative wall construction according to the present invention.

FIG. 10 depicts an alternative to the wall construction depicted in FIG. 8 wherein the discrete adhesive layer 142 has been eliminated. In this embodiment, the regrind layer 144 is also an enhanced layer to facilitate adhesion to the barrier layer 140. As with the embodiment depicted in FIG. 8, the regrind layer 144 could be eliminated from the structure in an alternative embodiment intended for manufacture by the reheat stretch blow molding method. In this alternative embodiment (not depicted), the outermost layer 146 is an enhanced layer in order to facilitate adhesion between itself and the adjacent intermediate barrier layer 140. Other alternative configurations will become apparent to those of ordinary skill in the art and are also contemplated by the present invention.

Preform

As with any preform designed for reheat stretch blow molding, the preforms of the present invention are designed to allow for efficient reheating and blow molding to provide a container having a material distribution that will be capable of withstanding the rigors to which it will be subjected. Primary among the concerns of designing a preform are the material distribution and orientation in the resulting container. Orientation of the preform material is achieved by raising the preform to a blow temperature below the melt temperature, axially elongating the preform with a stretchrod and expanding the preform radially to conform the preform to the mold cavity in which the preform resides. Optimum orientation can be achieved at a range of blow temperatures. As will be understood by one of ordinary skill in the art, all portions of the preform that will be expanded during blow molding must be within the range of blow temperatures during blow molding in order to obtain the desired material distribution and in order to orient those portions of the preform.

Thermal conductivity of PP is substantially lower than that of PET. For example, the thermal conductivity of PP has been found to be approximately 3.58 $(10^{-4}$ cal$)/($cm sec. $°$ C.$)$. PET, on the other hand has been found to have a thermal conductivity of approximately 6.92 $(10^{-4}$ cal$)/($cm sec. $°$ C.$)$. Similarly, PP has a higher heat capacity than PET causing it to hold heat longer than PET. For example, the heat capacity of PP has been found to be approximately 0.53 cal/g$°$ C. whereas PET has been found to have a heat capacity of approximately 0.32 cal/g$°$ C. Because of the differences in thermal conductivity and capacitance, a PP preform will take substantially longer than a like configured PET preform to heat from a given ambient temperature to an approximately uniform given blow temperature, as will be recognized by one of ordinary skill in the art. The PP preform also takes longer than the like configured PET preform to cool from a given injection temperature to a given ambient temperature. Blown containers of PP face a longer cool time as well.

The combination of the low thermal conductivity, high heat capacitance and high blow molding temperatures of PP dictate increased reheat times for PP preforms over like configured PET preforms. The preform configuration of the present invention overcomes the differences in thermal conduction and capacitance between PP and PET to allow efficient reheating for blow molding.

The range of temperatures in which PP will orient during blow molding is substantially narrow in comparison to that of PET. In one embodiment of the present invention, that temperature range (sometimes referenced herein as a "blow process window") has been found to be approximately 125-135$°$ C., more preferably 128-132$°$ C., for PP whereas a typical PET blow process windows ranges from 95-110$°$ C. Blow process windows for other PP grades are contemplated and will be recognized by one of ordinary skill in the art or determined through routine experimentation. It has been found that the entirety of those portions of the preform to be expanded during blow molding must be brought within the blow process window in order to properly blow mold an OPP container. If the outer skin of the preform is elevated to a temperature within the blow process window, 132$°$ C. for example, but the inner skin is at a temperature outside the blow process window, 120$°$ C. for example, with a temperature gradient therebetween, at least those portions of the preform not within the blow process window will not properly orient and will cause a defective container. In extreme cases, blowing a preform having inner portions below the blow process window can result in preventing proper inflation of the preform. If the outer skin is raised above the blow process window, insufficient orientation will be induced to produce an acceptably rigid container. Alternatively, if outer portions of the preform are blown at temperatures above the blow process window, the strain hardening necessary to cause the preform to inflate, as opposed to simply tearing under the blow pressure or stretchrod force, may be insufficient to hold the preform together during inflation. In such a case, one or more holes will open in the preform allowing the blow pressure to escape from within the preform preventing formation of a container.

Moreover, the degree of strain hardening will vary with the blow temperature, even within the blow process window, and "placement," during blow molding, of the various portions of the preform in corresponding portions of the mold cavity will vary with the blow temperature. For example, insufficient strain hardening, resulting from a high blow temperature, will allow portions of the preform to elongate more than designed and redistribute the preform portions lower in the resulting container than designed, as will be recognized by one of ordinary skill in the art. For example, the lower portions of the preform sidewall will be deposited in the base of the blow mold such that the base of the resulting container will comprise the material from the preform base portion as well as portions of the preform sidewall. The material in the base will not be able to stretch enough to sufficiently orient the base material, resulting in a defectively weak container base. The excess elongation of the preform will also produce thinner walls than desired. It will be understood by one of ordinary skill in the art that blowing a preform having portions at temperatures below the blow process window may result in upwardly redistributing portions of the preform and ultimately over thinning the base of the resulting container.

Straying from the blow process window can also result in delaminating multilayer preforms. The various layers of a multilayer preform, such as those containers of the present invention having a barrier layer, may be caused to separate due to variation in the degree of resistance to inflation, as will be recognized by one of ordinary skill in the art.

To avoid the various problems that can result from blowing preforms having portions thereof at temperatures outside of the blow process window, one embodiment of the preform of the present invention comprises walls that are substantially thinner than walls in known PET preform designs for construction the same container. As discussed in more detail below, thinning the preform walls reduces the temperature differential between the inner skin and the outer skin that will result during reheating and facilitate a more uniform temperature making it easier to maintain the entirety of the preform within the blow process window. Also, the time necessary to elevate the preform to the desired temperature is decreased. In one embodiment, the preform wall is designed to facilitate raising the entire preform wall to a temperature in the range of 128-132° C. during a commercially acceptable period of reheating. While the preform walls are ideally brought to a uniform temperature, one of ordinary skill in the art will recognize that the time required to bring a PP preform to a uniform temperature is commercially unattractive with current reheat processes and preform designs.

Figure 11:
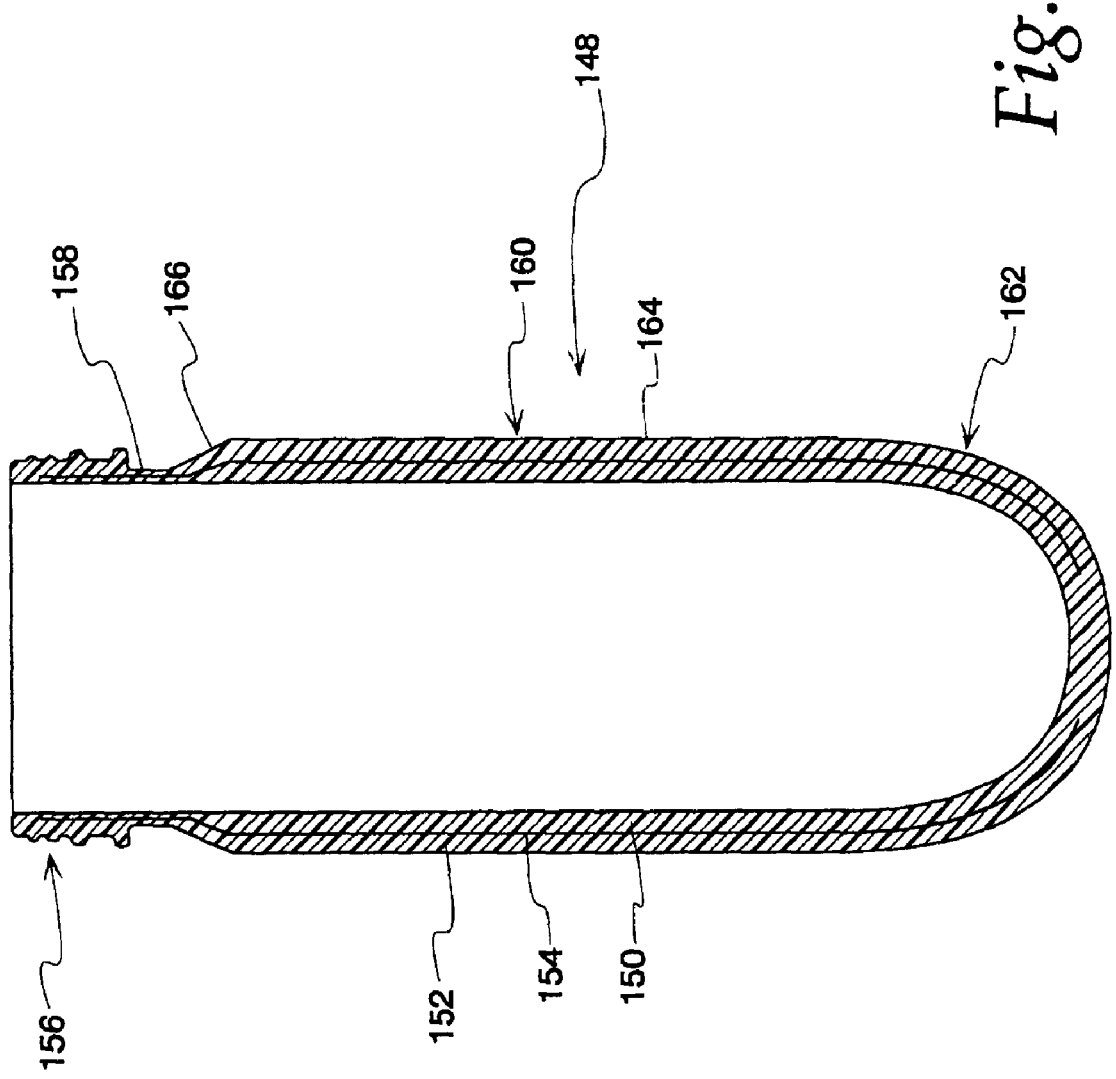
FIG. 11 is a vertical cross-sectional view of a preform constructed according to the present invention, taken through its longitudinal axis.

While each of the preforms depicted herein are multilayer, the preform designs, including thickness profiles, set out herein apply equally to monolayer preforms. FIG. 11 depicts one preform configuration of the present invention constituting a narrow-mouth elongated preform 148 of the type employed for reheat stretch blow molding elongated bottles such as the bottle 10 depicted in FIG. 1 herein. The preform 148 comprises an inner layer 150, an outer layer 152 and a barrier layer 154. The preform 148 is configured to define a finish 156, a neck 158 extending from the finish 156 and a body portion 160 extending from the neck 158 to a base 162 with the body defining a cylindrical wall portion 164 and a shoulder portion 166 between the neck 158 and the cylindrical wall portion 164. The neck 158 and body portion 160 defining a blow portion that will be expanded during blow molding.

FIG. 12A depicts a wide-mouth preform 168 of the type employed for reheat stretch blow molding a container such as any of those of the type depicted in FIGS. 3, 4A, 4B and 5 herein. The preform 168 comprises an inner layer 170, an outer layer 172 and a barrier layer 174. The preform 168 is configured to define a finish 176, a body portion 178 and a base 180 with the body 178 defining a cylindrical wall portion 182 and a shoulder portion 184. A neck portion 186 extends between the shoulder 178 and the finish 176. The neck 186, body portion 178 and base 180 define a blow portion that will be expanded and stretched during blow molding.

FIG. 12B depicts an alternative wide-mouth preform 188 of the type employed for reheat stretch blow molding a wide-mouth container such as any of those of the type depicted in FIGS. 3, 4A, 4B and 5 herein. The preform 188 comprises an inner layer 190, an outer layer 192 and a barrier layer 194. The preform 188 is configured to define a finish 196, a body portion 198 and a base 200 with the body 198 defining a cylindrical wall portion 202 and a shoulder portion 204. A neck portion 206 extends between the shoulder 204 and the finish 196. The neck 206, body portion 198 and base 200 defining a blow portion that will be expanded and stretched during blow molding.

Returning to FIG. 12A, the blow portion of the preform 168 of the present invention defines a wall thickness profile, described below but not depicted, designed to facilitate both an efficient reheating and a desired thickness profile in the resulting container. The neck 186 extends from the finish 176 at a relatively thin wall thickness t1. In one embodiment, the wall thickness of the preform 168 gradually increases from thickness t1 along the neck and body portion 178 until reaching the thickness t2 at the interface with the base portion 180. The base portion 180 extends until the base thickness again reaches the thickness t2 proximate a centerline 208 of the preform 168 to define a wall portion of increased thickness 187 in the base 180. The preform wall thickness then begins to thin from thickness t2 until reaching a thickness t3 at the preform centerline 208. While the thickness t3 is preferably thinner than wall thickness t2, it is contemplated that the thickness t3 may equal or exceed thickness t2. The thickness of the wall portion of increased thickness 187 can vary from thickness t2 between its ends to accomplish the purposes discussed below. Alternatively, as depicted in FIG. 12A, the wall portion of increased thickness 187 may have an approximately constant thickness t2 throughout.

The blow portion of the preform 168 has an overall height a, a base portion 180 height b, and a height c at the lower end of the wall portion of increased thickness 187. In one embodiment, the barrier layer is run roughly along a preform wall centerline (not shown) between the inner and outer skin of the preform 168 dividing the inner and outer layers 170 and 172 into approximately even thicknesses at any given point on the preform 168. It is, however, recognized that the barrier layer 174 may be moved closer to the inner or outer skin from the wall centerline. In the preform 168 depicted in FIG. 12A, a barrier layer 174 of approximately between 0.008-0.010 inches (0.02032-0.0254 cm) throughout the preform has been found to provide a sufficient barrier when the preform 168 is comprised of the below specified thickness for blow molding into a resulting OPP container of the configuration and dimensions of the container 100. Other barrier thickness are contemplated to increase or decrease the resistance to migration of gases, etc. in the container 100 and one of ordinary skill in the art will recognized the variations necessary in the preform 168 to accomplish variations in the resulting container 100.

Figure 13A:
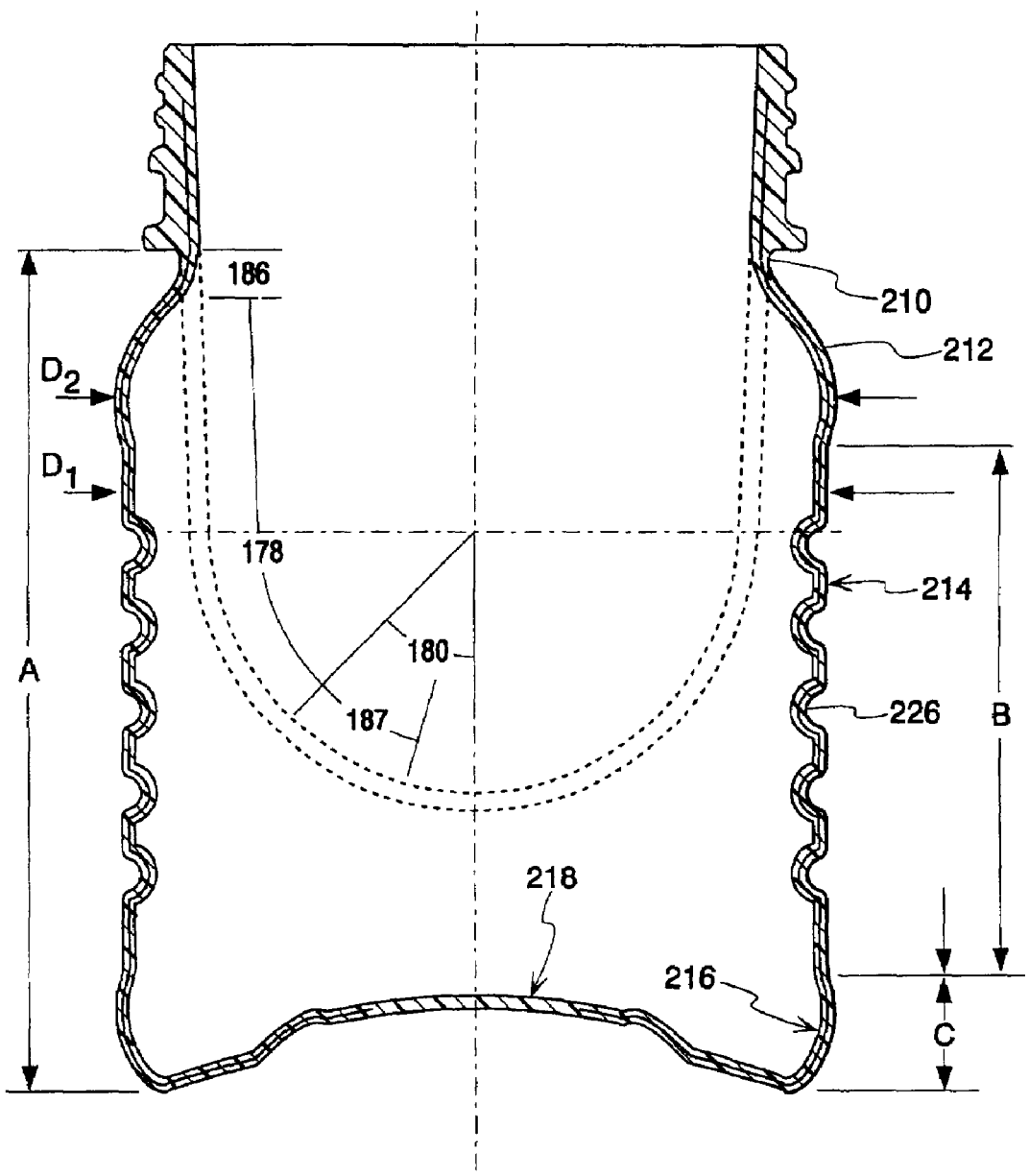
FIG. 13A is an overlay of the preform cross-sectional view of FIG. 12A onto the container cross-sectional view of FIG. 6.

The thickness profile discussed above in relation to FIG. 12A has been found to induce sufficient orientation in the preform 168, when the structural layers 170 and 172 are comprised of PP, to facilitate blow molding of high quality rigid container 100 as depicted in FIG. 13A. As will be recognized by one of ordinary skill in the art, the relative thicknesses of the preforms to the containers shown in the various figures, and most evidently in FIGS. 13A,B and 19A-D, have not been maintained in proper proportion so that a discernable cross-section of the container walls may be maintained. It is believed that the relatively thin neck portion 186 facilitates a thin, but oriented container neck portion. Because little axial or radial stretching is imparted to the neck portion of a typical container, the neck portion 186 is configured to be relatively close to the desired container neck thickness. The wall portion of increased thickness 187 provides a reserve of material to be placed in the base of the corresponding container during blow molding to provide the base with the material necessary for strength and drop impact resistance. Other preform thickness profiles and contours are contemplated and will become evident to those of ordinary skill in the art.

FIG. 13A depicts an overlay of the preform 168 depicted in FIG. 12A onto the container 100 depicted in FIG. 6 to demonstrate one embodiment of the correlation between the portions of a preform of the present invention and a container blow molded therefrom. As depicted, the neck portion 186 of the preform 168 is blown into a neck portion 210 of the container 100, the shoulder portion 186 of the preform 168 is blown into a shoulder portion 212, the cylindrical wall portion 182 is blown into the cylindrical wall 214, the wall portion of increased thickness 187 of the preform base 180 is blown into an outer portion 216 of the container base 218 as well as the contact ring which contacts the surface on which the container 100 rests. The relative size of the preform 168 to the container 100 as well as the thickness profile of the preform 168 result in a container 100 having thickness and orientation sufficient to withstand hot-filling and distribution through normal chains of commerce. The stretching imparted to the material and the clarifying agents employed in standard materials such as Solvay 4285 facilitate containers 100 having low haze values.

In the embodiment of the preform of the present invention depicted in FIGS. 12A and 13A, the wall portion of increased thickness 187 represents the thickest portion of the preform blow portion. As best seen in FIG. 13A and FIGS. 19A-D, the increased thickness of the wall portion of increased thickness 187 provides a reserve of material in the preform base 180 to insure that the resulting container base is provided with sufficient material and orientation to resist, for example, drop impact as well as vacuum resulting from hot-filling procedures. For example, the biaxially oriented containers of the present invention withstand drop impact 20-30% better than their extrusion blow molded counterparts. As discussed below in relation to FIGS. 19A-D, the reserve of material provided by the wall portion of increased thickness 187 is located in relatively low on the preform 168 and, as a result of the inward curvature of the base portion 180, inward of the outermost diameter of the preform blow portion. This low and inward location of the wall portion of increased thickness 187 allows it to be deposited in those portions of the base 218 that would otherwise receive insufficient material for purposes of structural rigidity. Specifically, the reserve of material in the wall portion of increased thickness 187 avoids becoming caught or hung-up on the annular ribs 226 intruding inward of the cylindrical wall 214. The location of the reserve of increased material thickness in the wall portion 187 circumvents the annular ribs 226 during blow molding and is distributed in the base 218. Other structural features such as vacuum panels could also be avoided in this manner and the thickness profile of the preform 168 discussed above can also be employed for this purpose. While the wall portion of increased thickness 187 may be located at any distance from the preform outermost diameter, it is preferred that the upper end of the wall portion of increased thickness 187 be located between 0.002 inch (0.00508 cm) and 0.015 inch (0.0381 cm) inward of the outermost diameter of the preform. Moving the upper end of the wall portion of increased thickness 187 further inward may require too great a thickness of the wall portion 187 to allow efficient reheating as discussed below.

The thickness profile can also be employed for containers without structural side wall features such as in the container depicted in FIG. 3 to insure that sufficient material is provided to the outer portions of the container base because regardless of the sidewall features, a container base having a foot diameter substantially close to the diameter of the sidewall, such as with the based depicted herein, will create a corner with a narrow opening through which sufficient material must be blown to create an outer base of the required rigidity. FIG. 19C, for example, depicts at least a portion of the wall portion of increased thickness 187 of the preform 168 entering an outer portion of a mold cavity base 546 to form a corresponding container base 216. Without the thickness of the wall portion 187 of increased thickness, the container base 216 might be too thin and weak.

It is contemplated that a wall portion of increased thickness, such as the wall portion 187 of the preform 168 depicted in FIGS. 12A and 13A, need not be of constant thickness. Rather, the thickness could, for example, increase slightly from opposing ends to create thicker middle and thinner ends. Other configurations of the wall portion of increased thickness 187 will become apparent to one of ordinary skill in the art to achieve the above discussed objective of providing a strong container base such as container base 216. It is also contemplated that the preform thickness t3 at the preform axis in the base, need not be thinner than the wall portion of increased thickness t2. The term "increased" in the term "wall portion of increased thickness" is employed to describe the preferred embodiment discussed above with reference to FIG. 12A. The thickness t3 merely need be designed to induce sufficient orientation and provide sufficient thickness to the center of a resulting container base.

The container 100, as depicted in FIG. 13A, has a finish of equal dimensions to the preform finish 176 because the finish is not subjected to blow molding as is known to those of skill in the art. The container 100 has a blow portion height A, the uppermost end of the cylindrical wall 214 extending to a height of B, and the base 218 extending to a height of C. The shoulder 212 and base 218 having an outermost diameter of D1 and the cylindrical wall 214 each having an outermost diameter of D2.

In one embodiment a preform of the configuration of preform 168 having the dimensions a=2.317 inch (5.89 cm), b=0.997 inch (2.53 cm), c=0.250 inch (0.635 cm), d1=2.480 inch (6.30 cm), t1=0.074 inch (0.188 cm), t2=0.120 inch (0.3048 cm), t3=0.090 inch (0.2286 cm), wherein the outer skin of the wall portion of increased thickness 187 began at an upper end at a distance from the axis 208 in the approximate range of 1.20 inch (3.048 cm) and terminated at a lower end at a distance from the axis 208 in the approximate range of 0.516 inch (1.311 cm), was found to facilitate blow molding of a strong container 100 having the dimensions A=3.655 inch (9.28 cm), B=2.200 inch (5.59 cm), C=0.550 inch (1.40 cm), D1=3.090 inch (7.85 cm), D2=3.150 inch (8.00 cm) and a blow portion wall thickness in the range of from 0.025-0.032 inch (0.0635-0.0813 cm).

In the embodiment of the preform of the present invention discussed above with relation to FIGS. 12A and 13A, the length a of the preform blow portion in relation to the length of the container blow portion A as well as the location of the reserve of material 187 allows the body portion 178 of the preform of the present invention to be substantially thinner than would be prescribed by known preform design parameters, while maintaining the gram weight necessary to construct the container 100. The thinner walls allow a reduced temperature differential between the inner skin and the outer skin during reheating and thus help to facilitate quicker reheating of the preform to temperatures within the blow process window without reaching the melt temperature.

Figure 13B:
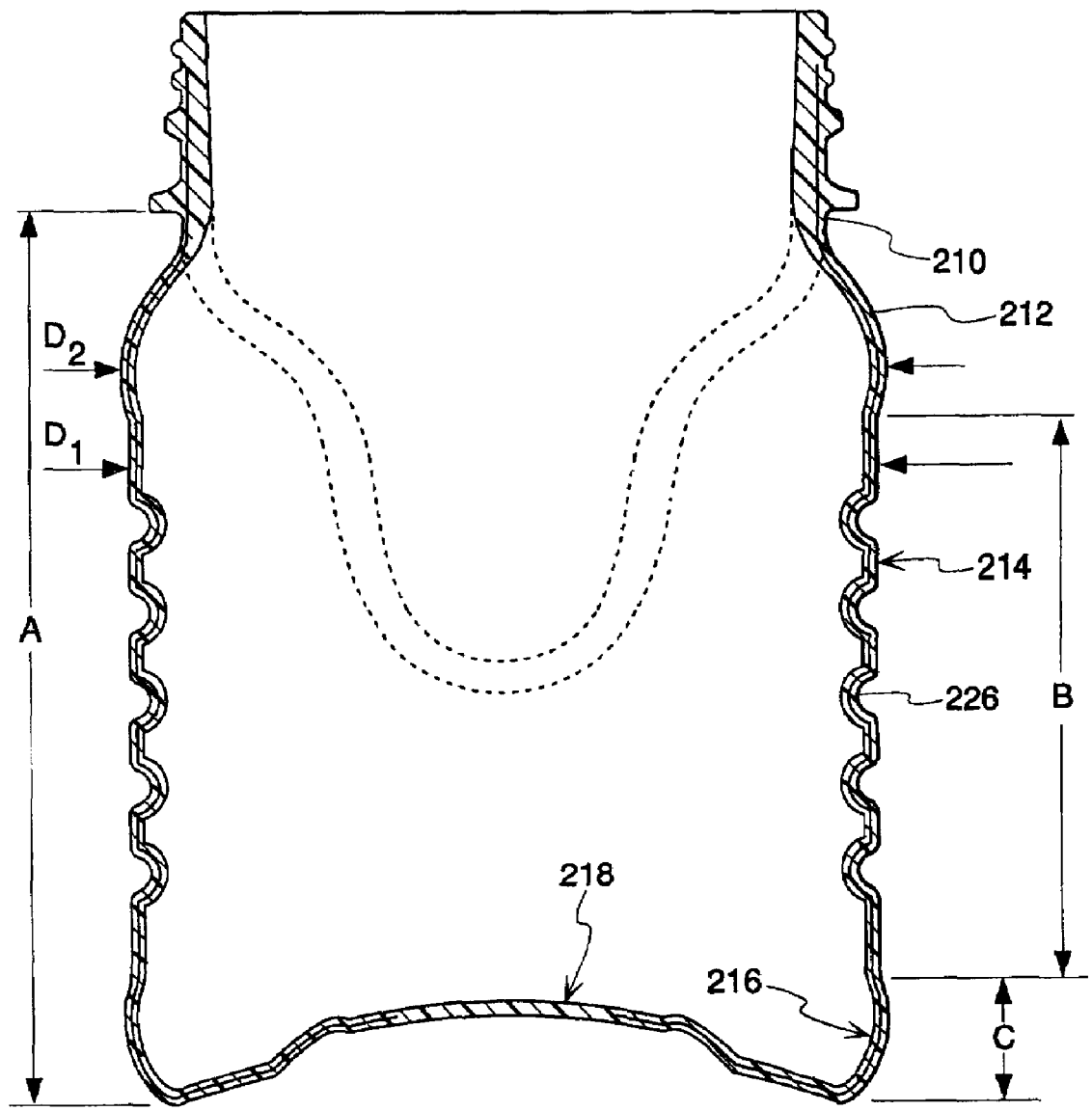
FIG. 13B is an overlay of a cross-sectional view of a PET preform constructed according to standard principals for stretch blow molding the container of FIG. 6 onto the container cross-sectional view of FIG. 6.

By way of comparison, FIG. 13B depicts one possible preform 228 designed according to standard design techniques for blow molding a PET barrier container of the configuration of the container 100. It can be seen by comparing FIGS. 13A and 13B that PET preform 228 design parameters dictate a preform substantially narrower and shorter than preform 168. As known to those of ordinary skill in the art, PET preforms, including multilayer preforms, are designed according to standard design techniques, to induce a radial stretch ratio of approximately 4.5:1 to 5.0:1 and an axial stretch ratio of approximately 2.0:1 to 2.5:1 in order to strain hardening the preform materials. This typically results in an area stretch ratio of roughly 9:1 to 12.5:1.

When indicated herein, the axial stretch ratio shall mean the ratio of the length of the blown portion of the container to the length of the blow portion of the preform from which it was blown, both as measured along their longitudinal axis. The radial stretch ratio shall mean the ratio of the largest outermost diameter of the container blown portion to the inner diameter at the largest outermost diameter of the preform blow portion from which the container was blown. Area stretch ratio, as is known by those of ordinary skill in the art, is the ratio of the container surface area to the preform surface area.

The relatively large axial and/or radial dimensions of the thin walled preforms, of the present invention dictate a lower stretch ratio compared to its thicker walled counterparts. It has been found that a radial stretch ratio of at least approximately 1.3:1 and an axial stretch ratio of at least approximately 1.4:1 will produce a commercially acceptable OPP container of the wide-mouth jar type depicted in FIG. 13A. In one example, a radial stretch ratio of approximately 1.3:1 was imparted to the preform 168 in FIG. 19A to reach the container in FIG. 19D, as was an axial stretch ratio of approximately 1.58:1. This resulted in an area stretch ratio of approximately 2.1:1.

Preform Injection

The preforms of the present invention may be constructed according to standard injection molding techniques known to those of ordinary skill in the art such as, by way of example only, the injection molding techniques described in U.S. Pat. Nos. 4,511,528 and 4,712,990, the entirety of which are incorporated herein by reference. Thermal gated injection molding techniques, known to those of ordinary skill in the art, are also contemplated.

With regard to injection molding barrier preforms according to the present invention, it has been found that the injection molding process and equipment is simplified because the ranges of preferred melt processing temperatures of PP and EVOH are overlapping. The melt flow temperatures of both PP and EVOH may be approximately in the range of 180-235° C. (more preferably 200-220° C. for PP and 190-210° C. for EVOH). Therefore, the two materials may be injected at close, or the same, temperatures. Neither the addition of adhesive agents or other modifications to create enhanced layers, have significantly altered the injection molding temperature of PP or EVOH. Because little or no temperature difference between the melt materials need be maintained in the injection equipment, it is relatively easy to maintain proper melt flow temperatures.

It has been found that the objectives of the present invention are more readily achieved by maintaining homogeneous melt material flow streams during injection of the preforms of the present invention such that fractures of the flow streams are reduced or eliminated. Specifically, it has been found that reducing or eliminating flow stream fractures increases the homogeneity of the preform layers, and containers blown therefrom, and produces a concomitant reduction. Homogeneous flow streams may be obtained by maintaining the temperature of each flow streams only slightly above the melt temperature of the polymer. For example, a temperature of from 200-260° C. for blow mold grade polypropylene has been found to assist in maintaining homogeneous flow streams. Maintaining the flow streams at a slow, constant rate of injection has also been found to assist in maintaining their homogeneity. For example, an injection cavity fill time of from 3-10 seconds for the preform 168 depicted in FIG. 12A has been found to provide homogeneous flow streams. Injecting the preform 168 at a high compression ratio also assists in maintaining homogeneous flow streams. A compression ratio of from 3-3.5 has been found beneficial in maintaining homogeneous flow streams.

It has also been found that a high degree of control over the barrier layer is desirable during injection to maximize barrier coverage in the preform. With reference to the preform 168 depicted in FIG. 12A, it has been found desirable to position a finish end 220 of the barrier layer 174 as close as possible to an uppermost extremity 222 of the preform finish 176 as allowed by the barrier flow front uniformity without the barrier breaking through the uppermost extremity 22 for the reasons of aesthetics and function discussed above. Flow front uniformity, as is known to those of ordinary skill in the art, refers to the distance between the foremost portion of the barrier leading edge and the aftmost portion of the leading edge. Although a perfectly uniform flowfront is usually desirable, it cannot always be achieved due to various flow disturbances. Accordingly the barrier will the desired location in some portions of the finish while not in others. An uneven barrier flowfront could, therefore, require the absence of barrier at some portions of the finish 176 in order to prevent barrier break-through at other portions. In one example, it has been found that obtaining complete barrier coverage at a position within 0.100 inches (0.254 cm) from the uppermost extremity 222 of the finish 176, without the barrier layer 174 without breaking through that uppermost extremity, will maintain an acceptable amount of gas migration through a resulting container. It is likewise desirable to place a base end 224 of the barrier layer as close as possible to the preform central axis 202 to limit migration of oxygen through the base of the container blown from the preform 168. As discussed above, the absence of barrier is substantially less tolerable in a container employing PP than a container employing other materials such as PET because of the relatively high permeability of PP by oxygen and carbon dioxide. A high degree of control over the barrier layer 174 may be maintained with standard apparatus and methods known to those of ordinary skill in the art. For example, it has been found that the barrier fold-over injection method disclosed in U.S. Pat. No. 4,554,190, the entirety of which is incorporated herein by reference, affords the ability to locate the barrier close to the finish uppermost extremity 222. Other contemplated injection methods will be recognized by those of ordinary skill in the art.

The condition of the injection cavity, which receives the melt material flow streams to form a preform according to the present invention, may also assist in reducing haze of a container blown from that preform. Specifically, decreasing the cooling time of the preform, such as by maintaining the injection cavity relatively cold, will limit or eliminate the time in which growth of spherulites is possible in the PP. For example, maintaining the injection cavity at a temperature of from 0-30° C. assists in cooling a preform of the present invention quickly enough to prevent the growth of spherulites in the PP when the melt materials are injected at 180-235° C. over a fill time of from approximately 3.0-10.0 seconds. Additionally, it has been found that employing an injection cavity having polished mold surfaces also assists in clarifying the container blow molded therefrom.

Reheat

The low thermal conductivity, high heat capacity and narrow blow process window (preferably 125-132° C.) of PP presents a unique difficulty in the reheating of a PP preform for blow molding. One known method of reheating a PP preform, as depicted in FIG. 14, is the simple heat-equilibrate method which comprises subjecting the outer skin of the preform to infrared radiation to raise the preform outer skin temperature To to a temperature above the target blow molding temperature Tb, then removing the preform from exposure to infrared radiation when the temperature To has reached a temperature Tmax that will elevate, via conduction, the remainder of the preform material to the blow molding temperature Tb at the time the temperature To has cooled to the blow molding temperature Tb. In this manner, the preform is uniformly brought to the blow molding temperature Tb. The temperature versus time diagram in FIG. 14 depicts the relation of the outer skin temperature To and the inner skin temperature Ti with respect to the blow molding temperature Tb over time as the preform is heated from ambient temperature to a uniform blow molding temperature Tb. When reheating a PP preform, the upper limit of Tmax is constrained only by the melt temperature of the outer layer. By way of example, the melt temperature of Solvay 4285 PP is roughly 160° C. If the melt temperature is exceeded, the preform may deform or collapse. Moreover, when the PP reaches its melt temperature, the molecules are freed to form larger crystals upon cooling than would be found in a PP reheated to the blow process temperature and blown.

The difficulties associated with reheating PP preforms are exacerbated by the addition of an intermediate layer to the preform which divides a majority of the PP into an inner layer and an outer layer as, for example, in the preforms depicted in FIGS. 11, 12A and 12B. First, the addition of an intermediate layer will prevent some of the infrared radiation directed at the outer skin of the preform from reaching the inner layer. This is due, at least in part, to absorption by the intermediate layer as well as reflection and refraction at the interfaces of the intermediate layer and each of the inner and outer layers. Because typical reheat equipment directs infrared radiation at the outer skin of the preform, the inner layer of a preform having an intermediate layer will gain less heat from the infrared radiation of this typical reheat equipment. The inner layer must then rely, at least in part, on heat conduction from the outer layer and the intermediate layer to approach the temperature of the outer layer. Therefore, a multilayer preform, such the preform 168 depicted in FIG. 12A, will require a greater amount of heat conduction from the outer layer to the inner layer than a mono-layer preform. Depending on the material and thickness of the intermediate layer, the two step heat-equilibrate method diagramed in FIG. 14 may require a Tmax greater than the melt temperature of the outer layer.

One aspect of the present invention entails a reheat method depicted in the temperature versus time diagram of FIG. 15. The diagram of FIG. 15 depicts the relation of the outer skin temperature To and the inner skin temperature Ti with respect to the blow molding temperature Tb over time as the preform is reheated from ambient temperature to a blow molding temperature Tb which may be a range such as the preferred PP blow molding process window of 125-132° C. The diagram in FIG. 15 also depicts the melt temperature Tmelt which the outer skin should not reach. The temperature Tmax may vary from manufacturer to manufacturer and from grade to grade as will be recognized by one of ordinary skill in the art.

With reference to the diagram of FIG. 15, the reheat method of the present invention comprises three stages. Stage 1 comprises elevating the outer skin temperature To approximately to a temperature Tmax that is below the Tmelt temperature, preferably staying at least approximately 10° C. below the Tmelt temperature for safe measure. Stage 2 comprises maintaining the outer skin temperature To at approximately Tmax for a period of time allowing the heat from the outer layer to be conducted through the barrier layer, into and through the inner layer to the inner skin, raising the inner skin temperature Ti as depicted. The outer skin temperature To will likely vary slightly throughout Stage 2 rather than remaining perfectly constant. However, by maintaining the outer skin temperature To at this elevated Tmax through Stage 2, sufficient heat will be conducted from the outer layer to the inner layer to compensate for the infrared radiation blocked by the addition of the intermediate layer. Stage 3 comprises allowing the out skin temperature To to reduce to the blow temperature Tb while the preform settles uniformly into the blow temperature Tb. Each stage can comprise one or more reheat ovens or, in the case of the final stage, no reheat oven may be necessary.

In one embodiment of a reheating apparatus for a PP preform according to the method diagramed in FIG. 15 and described above, FIG. 16 depicts a reheat apparatus having a frame 502 supporting a conveyor 504 for holding and conveying a series of preforms 506 past a series of reheat ovens 508. The series of reheat ovens 508 can be of the infrared radiation type or other type of reheat oven known in the art. However, infrared reheat ovens are depicted for purposed of explanation. As is standard in the art, each preform 506 is separately held on the conveyor 504 by a preform mount 510 which accepts the finish portion of a corresponding preform and imparts a rotation to the preform about its longitudinal axis so as to expose the outer skin of the preform to radiation from the series of reheat ovens 508 at all 360° of the preform about its longitudinal axis. The series of reheat ovens 508 are arranged in the numbers, and set at the powers necessary, to accomplish the reheating of the preforms as diagramed in FIG. 15. For example, Stage 1 of the reheat process diagramed in FIG. 15 could be accomplished by the first reheat oven 512 of the series of reheat ovens 508 depicted in FIG. 16. Stage 2 could be accomplished by the second and third reheat ovens 514, 516. In one embodiment, the second and third reheat ovens 514, 516 are set at lower power settings than the first reheat oven 512 because the second and third ovens 514, 516 need only maintain temperature To at a given temperature Tmax while the first reheat oven 512 is required to elevate the outer skin temperature from ambient temperature to Tmax. In this embodiment, Stage 3 is accomplished by the fourth reheat oven 518. In one embodiment, the fourth reheat oven 518 is set at a lower power setting than that of the second and third ovens 514, 516, and possible a zero power setting, to allow the temperatures To and Ti to approach to Tb. Because Stage 2 must elevate the inner layer temperature at least in part by conduction rather than through infrared radiation, and with a small heat differential (Tmelt=160° C. whereas the preferred Tb=128-132° C.), it is contemplated that Stage 2 will require a longer period of time than either Stage 1 or Stage 2. It is also contemplated that the number of reheat ovens and oven powers can be modified to achieve the reheat process diagramed in FIG. 15.

The specifics of the necessary number and length of the reheat ovens, the infrared radiation bulb configurations in each bed and the power of each bulb, is dictated by the specific material of the various layers of the preform, the various thicknesses and thickness profiles of the preform and the desired blow molding temperature to which they will be elevated. While the below examples discuss preforms of particular configurations and materials, the reheat process described herein may be employed with monolayer or multilayer preforms of any configuration to achieve a preform reheated to within the blow molding process window without reaching the melt temperature of the preform materials.

The relatively thin blow portion of the preform 168 of the present invention reduces the total time necessary to reheat the preform 168 in two ways. First, it places more of the material which constitutes the outer layer 172 on the surface of the preform creating more material exposed to direct infrared radiation. Second, it brings the inner skin closer to the outer skin and lessens the material through which the heat must be conducted. Reducing the reheat time is beneficial to the economics of manufacturing.

Figure 17:
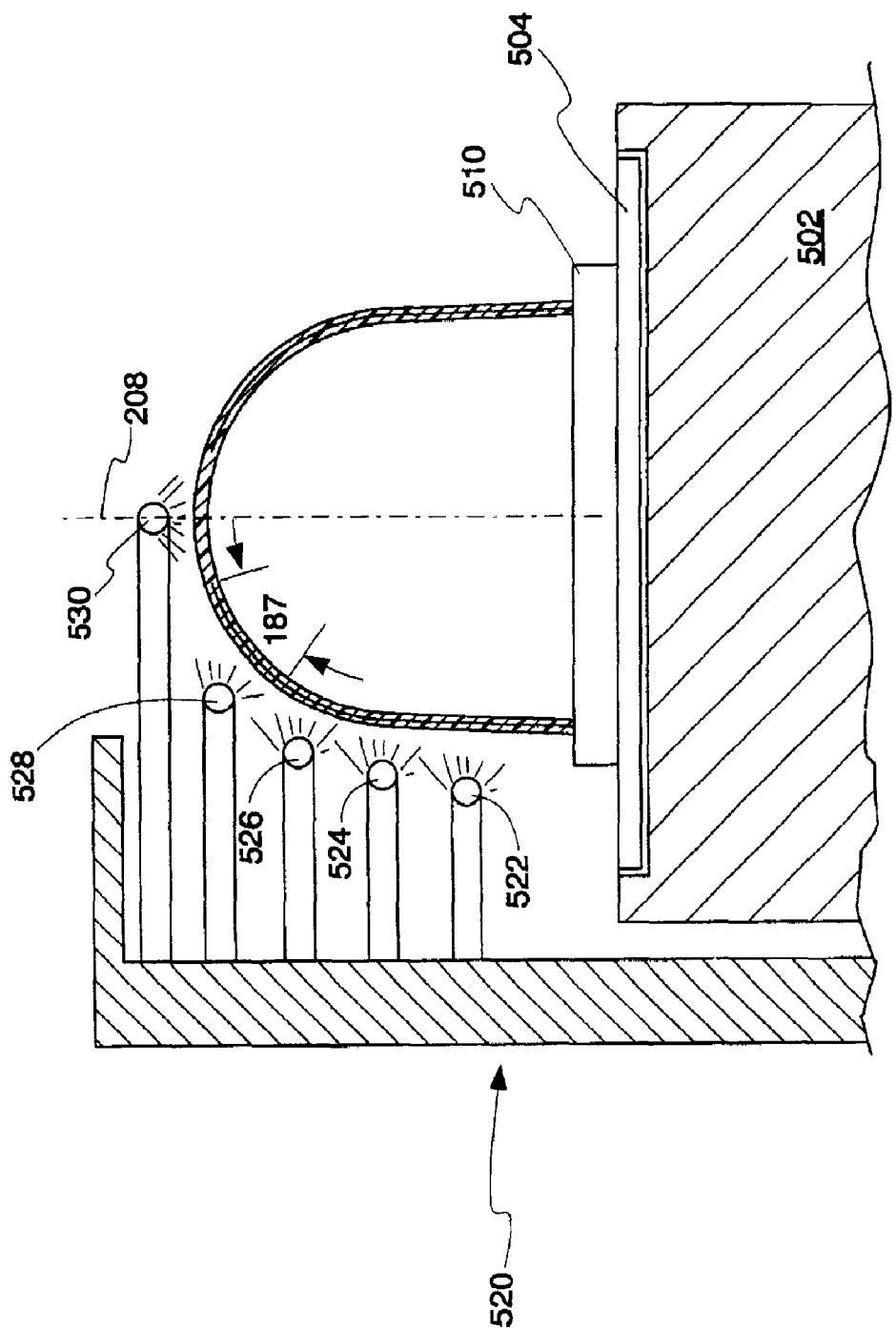
FIG. 17 depicts a cross-sectional view of the apparatus of FIG. 16.

Reheating of preforms constructed according to the present invention can be accomplished with reheat bulb configurations arranged according to principals known in the art for reheating monolayer OPP preforms or PET preforms of either monolayer or multilayer configuration. FIG. 17 depicts one reheat bulb configuration for reheating the preform 168 of FIG. 12A of the present invention. The reheat oven 520, which could constitute any one or more of the ovens 512, 514, 516 or 518, has five reheat elements 522, 524, 526, 528 and 530, that are preferably infrared bulbs and configured as depicted along the blow section of the preform 168 having the wall portion of increased thickness 187. The bulbs 522, 524, 526, 528 and 530 are positioned with respect to the preform 168 so as to heat adjacent portions thereof. The first bulb 522 radiates the neck 186 and shoulder 184. The second bulb 524 radiates the neck 186, shoulder 184 and a portion of the cylindrical sidewall 182. The third bulb 526 radiates the cylindrical sidewall 182 and a small portion of the base 180. The fourth bulb 528 is positioned so that it almost exclusively radiates the wall portion 187 of increased thickness t2. The fifth bulb 530 radiates the very tip of the preform as depicted.

The fourth bulb is provided an almost exclusive ability to radiate the area of increased thickness 187 so that the increased radiation needed to reheat this area of increased thickness 187 can be provided without elevating the temperature of the thinner portion of the base 180 at the axis 208 or the thinner body portion 178 above the melt temperatures. The fourth bulb 528 can be positioned slightly closer to the preform than proscribed by standard reheat bulb configurations in order to concentrate the radiation from that bulb on the area of increased thickness 187 and limit or prevent overflow of radiation to other portions of the preform.

REHEAT—EXAMPLE 1

By way of example, one embodiment of the reheat method of the invention, as represented in FIG. 18, comprised reheating a series of preforms 532 of the size and shape of the preform 168 depicted in FIGS. 12A and 13A for blow molding into a container of the size and shape of the container 100 depicted in that FIG. 13A. The wall thickness of the preform 168 in this example is as specifically set forth above for FIGS. 12A and 13A. The barrier segregates the sidewall into an inner layer and an outer layer of approximately equal thicknesses. In the embodiment of the preform 168 reheated in this example, the inner and outer layers comprised 85% Solvay 4285 PP and 15% Tymor 2E02 adhesive agent blended therein. The barrier layer employed in the example below comprised Evalca F-104BW EVOH.

In this example, the reheat ovens were standard ovens from a Sidel SBO 8/16 blow molding machine, as will be know to those of ordinary skill in the art. Each bed was set one immediately next to the other, as depicted, so that no gap existed therebetween and the preforms being conveyed thereby were exposed to continuous infrared radiation. For simplicity, each in the series of ovens comprised five infrared radiation bulbs configured as described in relation to FIG. 17, each spaced a vertical distance of 15 mm on center from the bulbs theread-jacent. The preforms were conveyed past the ovens at a rate of 0.14 meters per second for a total continuous reheat time of 42 seconds. The bulbs were at the following powers for each oven: Bulb 1-95%; Bulb 2-75%; Bulb 3-35%; Bulb 4-55%; Bulb 5-40%.

The preforms 520 in this example achieved a substantially uniform reheat temperature of approximately 130° C. after passing the series of ovens according to the above parameters.

Although the each reheat bed in this example comprised an identical bulb configuration for purposes of simplicity, variation of the bulb configurations from one heat bed to the next is contemplated to achieve the objectives of reheating a multilayer preform approximately according to the principals set forth in the diagram of FIG. 15.

REHEAT—EXAMPLE 2

Alternatively, it has been found that the reheat methods disclosed in U.S. Pat. Nos. 5,066,222 and 5,326,258, the entireties of which are incorporated herein by reference, may reheat a the preform described in Reheat Example 1 to a blow temperature of approximately 130° C. without surpassing the approximate 160° C. melt temperature of Solvay 4285. For example, as with Example 1, a series of preforms 532 of the size and shape of the preform 168 discussed in relation to FIGS. 12A and 13A for blow molding into a container of the size and shape of the container 100 discussed in relation to FIG. 13A. The barrier segregates the sidewall into an inner layer and an outer layer of approximately equal thicknesses. In the embodiment of the preform 168 reheated in this example, the inner and outer layers comprised 85% Solvay 4285 PP and 15% Tymor 2E02 adhesive agent blended therein. The barrier layer employed in the example below comprised Evalca F-104BW EVOH.

In this example, the reheat ovens were standard ovens from a Bekum RBU 225 blow molding machine, as will be know to those of ordinary skill in the art. Each bed was set one immediately next to the other, as depicted, so that no gap existed therebetween and the preforms being conveyed thereby were exposed to continuous infrared radiation. For simplicity, each in the series of ovens comprised five infrared radiation bulbs configured as depicted in FIG. 17 each spaced a vertical distance of 15 mm on center from the bulbs thereadjacent. The preforms were conveyed past the ovens at a rate of 0.011 m/s for a total continuous reheat time of 72 seconds. The bulbs were at the following powers for each oven: Bulb 1-65%; Bulb 2-35%; Bulb 3-37%; Bulb 4-30%; Bulb 5-67%.

The preforms in this example achieved a substantially uniform reheat temperature of approximately 130° C. after passing the series of ovens according to the above parameters.

Although the each reheat bed in this example comprised an identical bulb configuration for purposes of simplicity, variation of the bulb configurations from one heat bed to the next is contemplated to achieve the objectives of reheating a multilayer preform approximately according to the principals set forth in the diagram of FIG. 15.

Blow Molding

Blow molding preforms constructed according to the present invention is accomplished according to standard blowing techniques known in the art for blow molding monolayer OPP and monolayer and multilayer PET, adjusted to accommodate blow processing window of PP. Differences between PP and PET, particularly the difference in the amounts of stretching required for strain hardening, create difficulties in "moving" material past mold cavity intrusions from the sidewall such as the window panels 44 of the container 28 depicted in FIG. 2, the window panels 78 of container 62 depicted in FIG. 4A, the window panels 96 of container 80 depicted in FIG. 4B, and the annular ribs 116 of the container 100 depicted in FIGS. 5, 6 and 13A.

It has been found that blow molding a PP preform of uniform thickness in a mold cavity having such intrusions will cause material to become caught on the intrusions. The preform then will have insufficient material left to mold a container base of the desired thickness. The preform thickness profile of the present invention, one embodiment of which is discussed in relation to FIG. 12A, overcomes this problem by placing the wall portion of increased thickness 187 in and about the portion of the preform that will become the contact ring of the container base. Because the wall portion of increased thickness 187 is located on an inwardly curved base of preform, it does not contact the various intrusions of the type depicted in FIGS. 2, 4A, 4B and 5 during blow molding. Rather, as depicted in FIGS. 19A-19D, which exhibit various stages of blow molding the preform 168 depicted in FIG. 12A into the container 100 depicted in FIGS. 5,6 and 13A, the wall portion of increased thickness 187 avoids these intrusions and is placed in the base. Without increased volume of material in the wall portion of increased thickness 187, the base foot would have insufficient material to make the base foot of similar thickness to the remainder of the container.

Figure 19B:
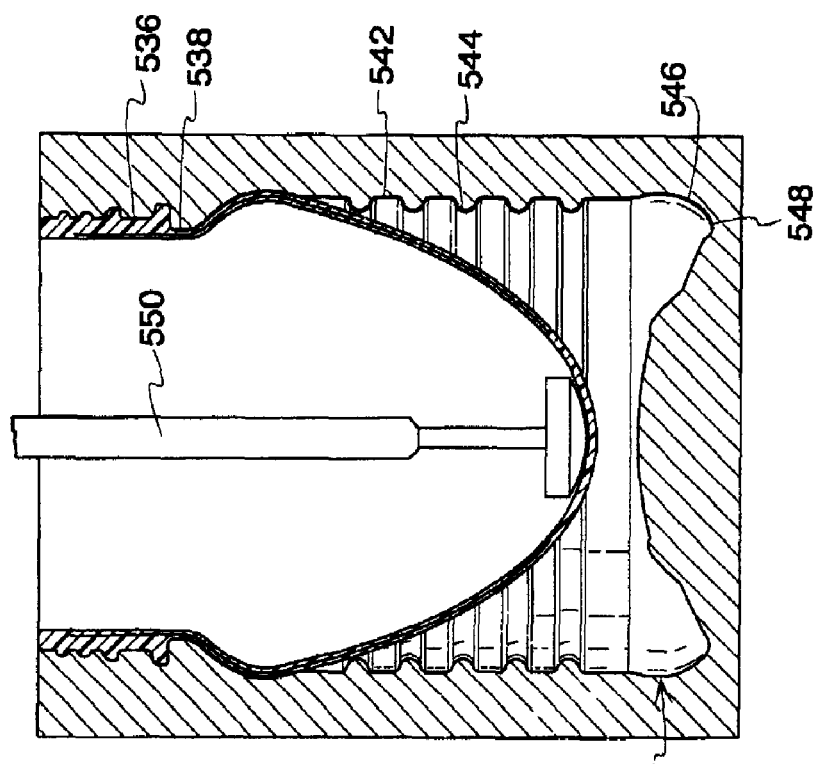
FIG. 19A-19D depict progressive stages of blow molding the preform of FIG. 12A into the container of FIG. 6.
Figure 19A:
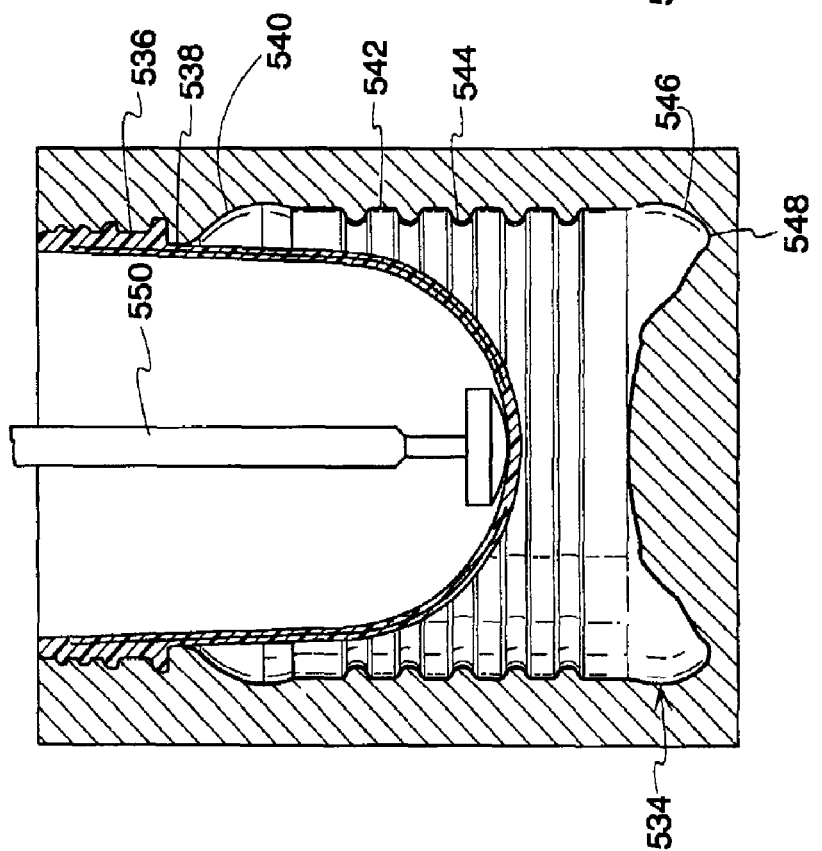
Figure 19D:
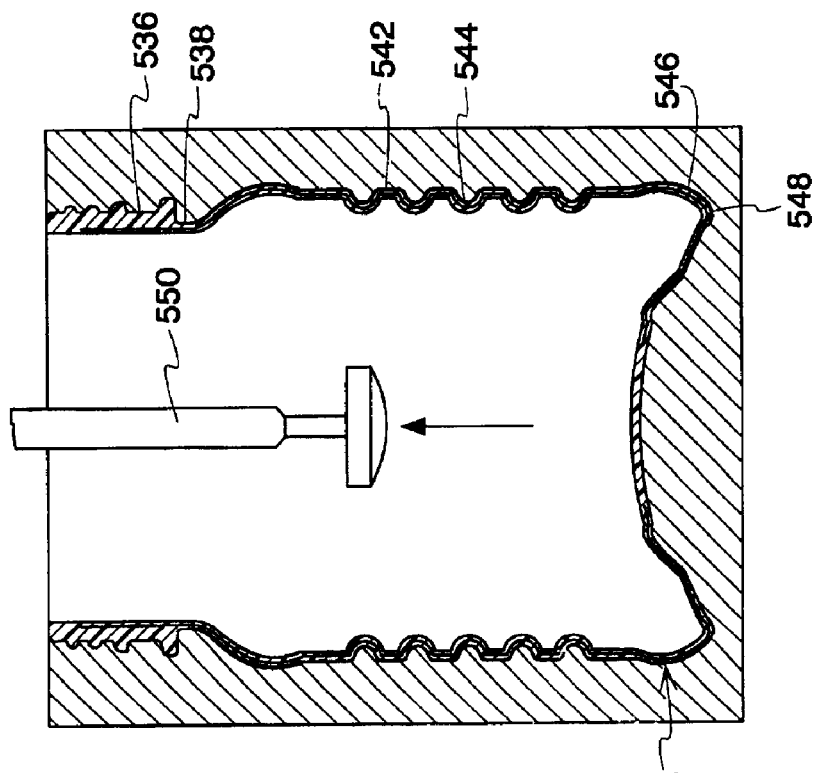
Figure 19C:
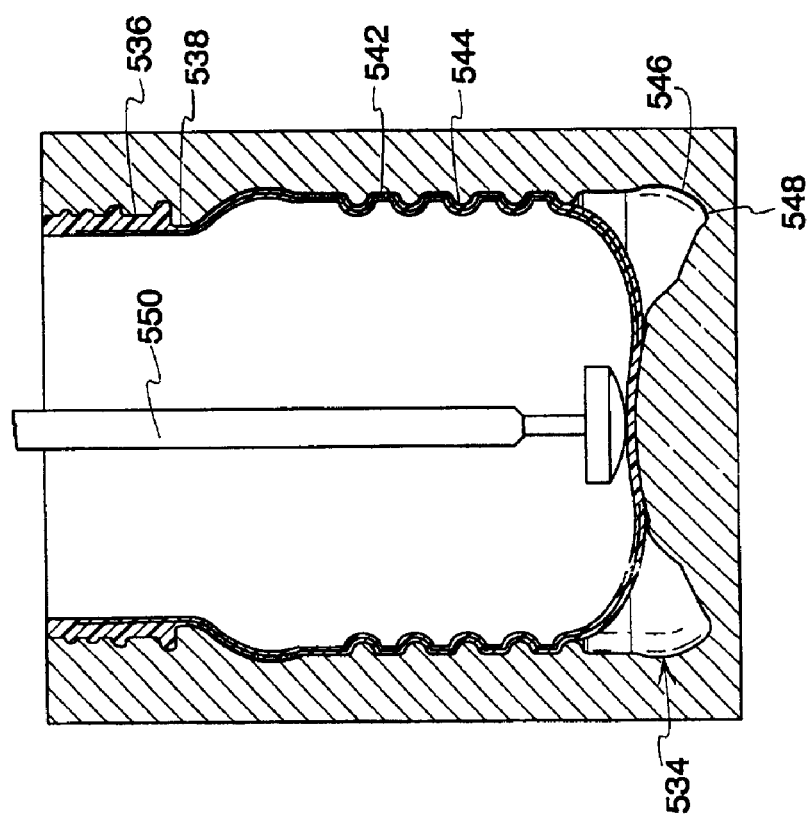

FIGS. 19A-19D depict various stages of the preform 168 being inflated to conform to the a mold cavity 534 having a finish 536 identical to that of the preform 168, a neck 538, a shoulder 540, a cylindrical wall 542 with annular ribs 544 and a base 546 having a foot 548. FIG. 19A depicts the preform 168 accommodated within the mold cavity 534 and one embodiment of the stretchrod of the present invention 550, described below, is in contact with the base 180 of the preform 168. The preform 168 has been reheated to an appropriate blow molding temperature. FIG. 19B depicts the stretchrod 550 having axially stretched the preform 168 and blow air having started the inflation of the preform 168. FIG. 19C depicts the cylindrical wall of the preform inflated against the cylindrical wall of the mold cavity 542 and the preform wall portion of increased thickness 187 positioned to be blown into the foot 548 of the mold cavity to form the container foot. FIG. 19D depicts the resulting container 100 conformed to the mold cavity 534 and the stretchrod 550 retracting back out of the mold cavity in preparation for expulsion of the container 100 from the cavity 534 and the accommodation of a subsequent preform for blow molding. As can be seen in FIGS. 19A-19D, due to the proximity of the preform wall portion of increased thickness 187 to the central axis 208 of the preform 168, as well its proximity to the base 546 of the cavity 534, the wall portion 187 of increased thickness t2 in the base 180 of the perform 168 does not come into contact with the intruding annular ribs 116. Rather, the wall portion 187 of increased thickness t2 is positioned in and around the foot 548 of the cavity base 546 to strengthen the base 106 of the resulting container 100. In this manner, the preform thickness profile of the present invention has overcome the difficulties with moving PP in a mold cavity. Despite the variation of the preform wall thickness, the resulting container 100 comprises a relatively constant thickness throughout the body 104 and base 106.

Certain general blow molding process parameters have also been found to facilitate molding the container 100 consistent with the objectives of the present invention from the above-described preform 168. For example, no preblow is needed when blowing the preform of FIGS. 12A and 13A into the container depicted in FIG. 13A because the preform needs little radial enlargement.

BLOW MOLDING EXAMPLE 1

In one embodiment, a Bekum RBU225 blow molding machine was employed to blow barrier PP preforms of the type depicted in FIGS. 12A and 13A and of the dimensions set forth therein were reheated in a standard Bekum reheat oven to a temperature in the range of approximately 128-132° C. throughout the entire blow portion of the preform using the method described in U.S. Pat. Nos. 5,066,222 and 5,326,258. The preforms were blown into containers of the configuration depicted in FIGS. 6 and 13A, and of the preferred dimensions discussed in relation thereto, was accomplished with a blow air pressure of approximately 11 bar (159.5 psi) and with no delay between the initiation of blow air and initiation of axial elongation of the preform with the stretchrod. The blow air was held for 2.5 seconds.

The resulting container comprised a thickness throughout the body and base ranging from 0.025 inch (0.0635 cm) to 0.033 inch (0.0838 cm).

Stretchrod

Figure 20:
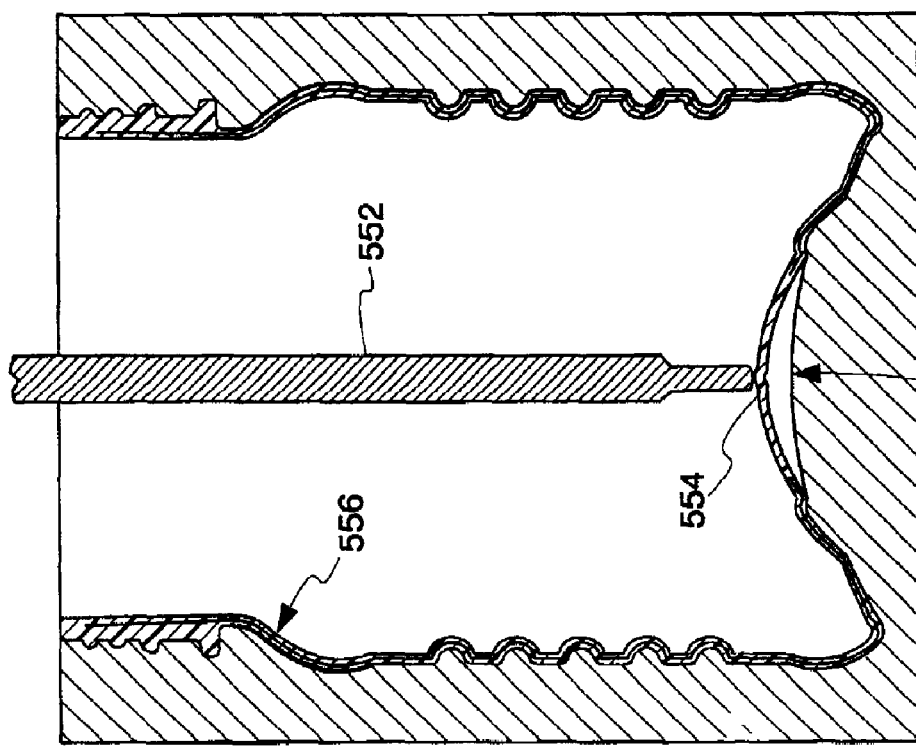
FIG. 20 depicts a prior art stretchrod deforming a blown container.

It has been found that preforms constructed according to the present invention may tend to adhere to a stretchrod of standard construction when allowed to be elevated to high temperatures as a result of continuous blow molding at commercial production frequencies with the same stretchrod. FIG. 20 depicts the effect of this adhesion with a standard stretchrod 552 having a standard tip. As depicted in FIG. 20, when the stretchrod 552 adheres to the enhanced PP at the gate area 554 of the blown container 556, the stretchrod 552 pulls the gate area 554 of a resulting container 556 back into the volume of the container 556 as the stretchrod 552 retreats from the mold cavity 558 in preparation for the mold receiving a subsequent preform for molding. The deformed container gate area 554 weakens the base of the container 556 rendering it defective for commercial applications. The resulting aesthetics also render the container 556 defective.

It is believed that adhesion between the preform and a standard stretchrod, such as stretchrod 552, tends to occur as the stretchrod approaches the PP blow temperature. In one embodiment, sticking has been found to begin after continuous blow molding at a blow temperature of approximately 131° C. Blowing containers at a high frequency provides a standard stretchrod inadequate time to cool between cycles. After continued operation, the standard stretchrod 552, and most importantly the stretchrod tip, approaches the blow molding temperature of PP as heat is transferred from the preform to the stretchrod by conduction and convection. The temperature reached by any given stretchrod for a given preform temperature and given molding frequency will be referred to herein as the steady state temperature of the stretchrod.

By way of example, adherence was witnessed when employing a standard steel 18 mm stretchrod in a Bekum RBU225 blow molding machine blowing 120 consecutive preforms constructed of 85% Solvay 4285 PP with 15% Tymor 2E02 adhesive grafted thereto, wherein the preforms were reheated to a temperature of approximately between 130-132° C. Although lowering the reheated temperature of the preforms would lower the steady state temperature of this stretchrod, it could also cause fracture of the PP chains in the base, reducing the structural strength thereof. In extreme cases, reducing the blow molding temperature of the preforms could cause the stretchrod to rupture the preform during axial elongation. Strain hardening would also be affected.

Figure 21:
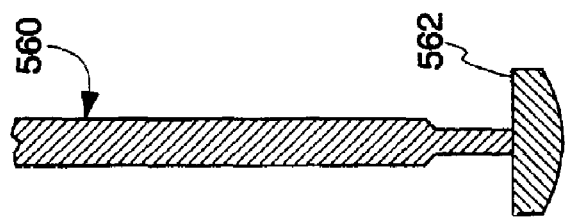
FIG. 21 depicts one embodiment of a stretchrod of the present invention.

The stretchrod of the present invention maintains a steady state temperature sufficiently cooler than the blow molding temperature of PP to prevent sticking by, in part, being comprised of a material having a high thermal conductivity, such as aluminum. Additionally, the size of the stretchrod tip is increased to increase its surface area and, thus, the rate of convection to cool the stretchrod tip. The surface area of the tip backside (i.e. the side that does not contact the preforms) may optionally be provided with one or more features to increase its surface area and, therefore, its rate of convection. In one embodiment, FIG. 21 depicts a stretchrod 560 of the present invention having a mushroom-type tip 562. The mushroom-type tip 562 is also depicted in FIGS. 22A and 22B. The tip 562 is round and symmetrical about its longitudinal axis 564. The tip 562 comprises a threaded attachment insert 566, for threading into the stretchrod 560, and a disk 568. The disk 568 comprises an arcuate stretching surface 570, an annular wall 572 and a backside 574. The arcuate stretching surface 570 is constructed to have a radius of curvature approximating that of the preform surface with which it is intended to have contact. In one embodiment of the present invention, a preform tip 562 employed to stretch the preform 168 in FIG. 12A has an outer diameter of 0.985 inch (2.50 cm) when the outer diameter of the preform 168 is 2.48 inch (6.30 cm). The backside 574 is optionally provided with a number of holes 576 to increase the backside surface area and provide a concomitant increase in the potential rate of heat convection from the tip 562. The holes 576 are dispersed about the backside 574 between the annular wall 572 and an outline 578 of the interface between the backside 574 and the stretchrod 560. Alternative manners of increasing the surface area of the tip backside 574 are also contemplated. For example, fins (not depicted) could be configured to extend from the backside 574 or grooves (not depicted) could be cut into the backside. Other configurations to increase the surface are of the backside 574 will be recognized by one of ordinary skill in the art.

It has also been found that the large stretching surface 570 decreases the stress in those portions of the preform directly contacting the stretchrod tip 562. Fracture of the preform material is thereby reduced.

In one embodiment, the stretchrod tip 562 is larger than the hole in the barrier layer of the preform, if any, at the gate of the preform. It is believed that if the stretchrod tip 562 directly contacts the portion of the preform inner layer directly adjacent to the at least the base end of the barrier layer, then the stretchrod tip 562 will itself impart axial elongation to the barrier layer rather than relying on the adhesive force between the barrier layer and the inner and outer layers to transmit the force from the stretchrod tip 562.

Haze

In addition to structural rigidity and barrier protection, the containers of the present invention have a low haze value. A haze value is defined as the percent of total light which, in passing through the specimen, deviates through forward scatter by more than 0.044 rad (2.5°) on the average. The preferred test to obtain the haze value of the bottle is ASTM Method D-1003 as defined in the 1995 Annual Book of ASTM Standards, Volume 8.01. It is believed that stretching of PP breaks down crystals found in the semi-crystalline material from which injection molded preforms are comprised. As the size of the crystals are reduced in a layer of that material, so is the amount of light scattered by that layer. Although the size of PP crystals in amorphous PP comprising a clarifying agent are smaller than crystals in amorphous PP not comprising a clarifying agent, a reduction in crystal size will also be experienced with clarified PP as a result of stretching. In one embodiment, the containers of the present invention have a haze value of less than approximately 20% in their sidewall. In another embodiment, the bottles have a haze value of 10-12% in at least the sidewall thereof.

It will be understood by those of ordinary skill in the art that the finish of the container will have a higher haze value than the sidewall because no stretching is induced therein. Similarly, the centermost portions of the container base will have a higher haze value than the sidewall because little stretching is typically induced therein. Beneficially, those portions of the container that have been provided no stretching (as in the finish) or little stretching (as in the base), are clearer than their non-clarified counterparts.

HAZE EXAMPLE 1

By way of example, a container of the configuration depicted in FIG. 13A and described herein having enhanced PP layers comprising Solvay 4285 in the amount of 85% by weight and Tymor 2E02 in the amount of 15% by weight and having a total wall thickness of from 0.025-0.028 inch, having a barrier layer comprising Evalca F104BW EVOH with a thickness of approximately 0.0015, was blown from the preform depicted in FIG. 12A at the blow process temperature of approximately 128° C. to form a container having haze value of approximately less than 20% in the body portion thereof.

HAZE EXAMPLE 2

A container of the configuration depicted in FIG. 13A and described herein having enhanced PP layers comprising Solvay 4285 in the amount of 90% by weight and Tymor 2E02 in the amount of 10% by weight and having a total wall thickness of from 0.025-0.028 inch, having a barrier layer comprising Evalca F104BW EVOH with a thickness of approximately 0.0015 inch was blown from the preform depicted in FIG. 12A at the blow process temperature of approximately 128° C. to form a container having haze value of approximately less than 20% in the body portion thereof.

HAZE EXAMPLE 3

A container of the configuration depicted in FIG. 13A and described herein having enhanced PP layers comprising Solvay 4285 in the amount of 85% by weight and Tymor 2E04 in the amount of 15% by weight and having a total wall thickness of from 0.025-0.028 inch, having a barrier layer comprising Evalca F104BW EVOH with a thickness of approximately 0.0015 inch, was blown from the preform depicted in FIG. 12A at the blow process temperature of approximately 128° C. to form a container having haze value of approximately less than 20% in the body portion thereof.

HAZE EXAMPLE 4

A container of the configuration depicted in FIG. 13A and described herein having enhanced PP layers comprising Solvay 4285 in the amount of 90% by weight and Tymor 2E04 in the amount of 10% by weight and having a total wall thickness of from 0.025-0.028 inch, including a barrier layer comprising Evalca F104BW EVOH with a thickness of approximately 0.0015 inch, was blown from the preform depicted in FIG. 12A at the blow process temperature of approximately 128° C. to form a container having haze value of approximately less than 20% in the body portion thereof.

HAZE EXAMPLE 5

A container of the configuration depicted in FIG. 13A and described herein having enhanced PP layers comprising Solvay 4285 in the amount of 95% by weight and Fusabond 353D in the amount of 5% by weight and having a total wall thickness of from 0.025-0.028 inch, having a barrier layer comprising Evalca F104BW EVOH with a thickness of approximately 0.0015 inch, was blown from the preform depicted in FIG. 12A at the blow process temperature of approximately 128° C. to form a container having haze value of approximately less than 15% in the body portion thereof.

HAZE EXAMPLE 6

A container of the configuration depicted in FIG. 13A and described herein having enhanced PP layers comprising Solvay 4285 in the amount of 97% by weight and Fusabond 353D in the amount of 3% by weight and having a total wall thickness of from 0.025-0.028 inch, having a barrier layer comprising Evalca F104BW EVOH with a thickness of approximately 0.0015 inch was blown from the preform depicted in FIG. 12A at the blow process temperature of approximately 128° C. to form a container having haze value of approximately less than 15% in the body portion thereof.

EXAMPLES OF CONTAINER CONSTRUCTION

Enhanced PP Layers/Non-enhanced Barrier Layer

The amount of adhesive agent blended into the base polypropylene depends on the maleic anhydride concentration of the adhesive. While other concentrations are contemplated, it has been found that, typically, enough adhesive agent must be added to the PP such that the resulting enhanced PP has a maleic anhydride content of approximately between 0.01%-0.20% by weight of the enhanced PP. For example: 10% of an adhesive agent containing 0.15% maleic anhydride would provide a maleic anhydride content of 0.015% by weight. As discussed above, the greater the percentage of maleic anhydride or other adhesive used, the better the barrier layer will adhere to the structural layers.

The following are representative examples of the structures contemplated as having enhanced PP layers and a non-enhanced barrier layer.

Construction Example 1

A three-layer injection molded preform was made having inner and outer layers made from an enhanced PP containing about 85% PP and 15% adhesive agent blended therein and a barrier layer between the inner and outer layers. The PP was Solvay 4285. The adhesive agent was Tymor 2E02. The barrier layer was Evalca LCE-105A EVOH (having a 44% ethylene content). The preform was then stretch blow molded to form a substantially transparent container having a haze value of approximately 10-12% measured through a section of the container having a thickness of approximately 15-20 mils.

Construction Example 2

A three-layer preform was injection molded as in Example 1 except that the percentages of PP and adhesive agent in the inner and outer layers were 90% PP and 10% adhesive agent blended therein. The preform was stretch blow molded to form a substantially transparent container having a haze value of approximately between 10-12% measured through a section of the container having a thickness of approximately 15-20 mils.

Construction Example 3

A three-layer container was made by a coextrusion blow molding process wherein the layers were extruded together as a tube which was then blow molded to form the container. The inner and outer layers were made from an enhanced PP containing about 90% PP and 10% adhesive agent blended therein. The PP was Montel SR256M. The adhesive agent was Tymor 2E02. The barrier layer was comprised of Evalca LCE-105A EVOH.

Construction Example 4

A three-layer preform was injection molded as in Example 1 except that the EVOH used was Evalca LCF-104AW (having a 32% ethylene content). The preform was then stretch blow molded to form a low haze container.

Construction Example 5

A three-layer preform was injection molded as in Example 1 except that the EVOH used was Evalca LCL 101A (having a 27% ethylene content). The preform was then stretch blow molded to form a low haze container.

Construction Example 6

A three-layer preform was injection molded as in Example 1 except that the EVOH used was Nippon Gohsei Soamol DC3203. The preform was then stretch blow molded to form a substantially low haze container.

Construction Example 7

A three-layer preform was injection molded as in Example 1 except that the barrier material was comprised of Mitsubishi's MXD6-6121 nylon. The preform was then stretch blow molded to form a low haze container.

Construction Example 8

A three-layer preform was injection molded as in Example 1 except that the PP was Fina 7426MZ. The preform was then stretch blow molded to form a low haze container.

Construction Example 9

A three-layer preform was injection molded as in Example 1 except that the PP was Montel SR256M. The preform was then stretch blow molded to form a low haze container.

Construction Example 10

A three-layer preform was injection molded as in Example 1 except that the inner and outer layers were 100% Mitsui Admer QB510A. The preform was then stretch blow molded to form a low haze container.

Construction Example 11

A three-layer preform was injection molded as in Example 1 except that the percentages of PP and adhesive agent in the inner and outer layers were comprised of 90% PP and 10% adhesive agent blended therein, wherein the PP was Solvay 4285, the adhesive agent was DuPont Bynell 50E571 and the EVOH was Evalca LC-E105. The preform was then stretch blow molded to form a low haze container.

Construction Example 12

A three-layer preform was injection molded as in Example 11 except that the EVOH was Evalca F104BW. The preform was then stretch blow molded to form a low haze container.

Construction Example 13

A three-layer preform was injection molded as in Example 11 except that the PP was Amoco 8649-X, the adhesive agent was Tymor 2E02 and the EVOH was Evalca LC-E105A. The preform was stretch blow molded to form a low haze container.

Construction Example 14

A three-layer preform was injection molded as in Example 11 except that the PP was Amoco 8649-X, the adhesive agent was Tymor 2E02 and the EVOH was Evalca F104BW. The preform was stretch blow molded to form a low haze container.

Construction Example 15

A three-layer preform was injection molded as in Example 2 except that the EVOH was Evalca LC-E105. Interlayer adhesion was obtained. No container was blown.

Construction Example 16

A three-layer preform was injection molded as in Example 2 except that the PP was Montel X-11651 and the EVOH was Evalca F104BW. The preform was stretch blow molded to form a low haze container.

Construction Example 17

A three-layer preform was injection molded as in Example 1 except that the inner and outer layers were comprised of 80% PP, 10% adhesive agent and 10% EVOH. The PP was Solvay 4285. The EVOH was Evalca F104BW. The adhesive agent was DuPont Bynell 50E571. Interlayer adhesion was obtained. No container was blown.

Construction Example 18

A three-layer preform was injection molded as in Example 1 except that the EVOH was Evalca 104BW. The preform was stretch blow molded to form a low haze container.

Construction Example 19

A three-layer preform was injection molded as in Example 18 except that the adhesive agent was Tymor 2E04. The preform was stretch blow molded to form a low haze container.

Construction Example 20

A three-layer preform was injection molded as in Example 19 except that the EVOH was Evalca XEP-561. The preform was stretch blow molded to form a low haze container.

Construction Example 21

A three-layer preform was injection molded as in Example 19 except that the EVOH was Evalca XEP-719. The preform was stretch blow molded to form a low haze container.

Construction Example 22

A three-layer preform was injection molded as in Example 19 except that the EVOH was Evalca XEP-721. The preform was stretch blow molded to form a low haze container.

Construction Example 23

A three-layer preform was injection molded as in Example 19 except that the EVOH was Evalca ETC-127. The preform was stretch blow molded to form a low haze container.

Construction Example 24

A three-layer preform was injection molded as in Example 19 except that the EVOH was SoarusD2908. The preform was stretch blow molded to form a low haze container.

Construction Example 25

A three-layer preform was injection molded as in Example 19 except that the EVOH was Soarus SG430. The preform was stretch blow molded to form a low haze container.

Construction Example 26

A three-layer preform was injection molded as in Example 19 except that the barrier material was Grivory G21 nylon. The preform was stretch blow molded to form a low haze container.

Construction Example 27

A three-layer preform was injection molded as in Example 19 except that the barrier material was Mitsubishi MxD6 type 6001 nylon. The preform was stretch blow molded to form a low haze container.

Construction Example 28

A three-layer preform was injection molded to have inner and outer layers made from an enhanced PP, containing about 90% PP and 10% adhesive agent blended therein, and a barrier layer between the inner and outer layers. The PP was Solvay 4285. The adhesive agent was Tymor 2E07-3. The barrier layer was Evalca F-104BW EVOH. The preform was then stretch blow molded to form a substantially transparent container having a low haze value.

Construction Example 29

A three-layer preform was injection molded to have inner and outer layers made from an enhanced PP, containing about 95% PP and 5% adhesive agent blended therein, and a barrier layer between the inner and outer layers. The PP was Solvay 4285. The adhesive agent was Fusabond 353D. The barrier layer was Evalca F-104BW EVOH. The preform was then stretch blow molded to form a substantially transparent container having a low haze value.

Construction Example 30

A three-layer preform was injection molded as in Example 29 except that the barrier layer was Evalca ETC-127 EVOH. The preform was stretch blow molded to form a low haze container.

Construction Example 31

A three-layer preform was injection molded as in Example 29 except that the adhesive agent was Fusabond 411D. The preform was stretch blow molded to form a low haze container.

Construction Example 32

A three-layer preform was injection molded as in Example 29 except that the adhesive agent was Fusabond 536D. The preform was stretch blow molded to form a low haze container.

Construction Example 33

A three-layer preform was injection molded as in Example 29 except that the barrier layer was 22X17-5 and the Fusabond 353D adhesive agent was present in the enhanced PP layer in the amount of about 2% while the Solvay 4285 PP was present in the amount of about 98%. The preform was stretch blow molded to form a low haze container.

The bottles achieved in the above Examples 1-14, 16 and 18-33 exhibit low haze values, good strength and provide carbon dioxide, oxygen and moisture barrier.

Non-enhanced PP Layers/Enhanced Barrier Layer

The following are representative examples of the structures contemplated as having an enhanced barrier layer and non-enhanced structural layers.

Construction Example 34

A three-layer preform was injection molded having inner and outer layers made from 100% Solvay 4285 PP and a barrier layer between the inner and outer layers. The barrier layer was made from 100% Evalca XEP403 resin. The preform was then stretch blow molded to form a low haze container.

Construction Example 35

A preform was made as in Example 1 except that the PP used for the structural layers was Fina 7426MZ and the barrier layer was comprised of Evalca XEP403 EVOH having 100 ppm of Cobalt. The preform was then stretch blow molded to form a low haze container.

Construction Example 36

A preform was made as in Example 1 except that the PP used for the structural layers was Fina 7635XM Clear Polypropylene.

Construction Example 37

A preform was made as in Example 1 except that the barrier layer was comprised of 98% Evalca F-104BW EVOH with 2% Fusabond 353D adhesive agent blended therein. The preform was then stretch blow molded to form a low haze container.

The bottles made in the above Examples 34-37 above exhibited low haze, good strength and carbon dioxide, oxygen and moisture barrier protection.

Enhanced PP Layers/Enhanced Barrier Layer

Construction Example 38

A three-layer preform was injection molded having enhanced structural layers comprising from 95% Solvay 4285 PP with 5% Tymor 2E02 blended therein. The enhanced barrier layer comprised 50% Evalca F104BW EVOH and 50% Tymor 2E02 blended therein. The preform exhibited excellent interlayer adhesion. No container was blown.

We claim:

1. An injection molded preform for stretch blow molding a container comprising polypropylene, the preform defining a longitudinal axis and comprising a finish having a support flange, and a preform blow section comprising a neck extending from the support flange, a sidewall extending from the neck and a base closing the blow section, the base having a wall portion of increased thickness defining a thickness greater than all other portions of the blow section, the wall portion of increased thickness not covering the preform longitudinal axis.

2. The preform of claim 1, the base portion thinning from the base portion of increased thickness to the preform longitudinal axis.

3. The preform of claim 1, the sidewall increasing in thickness from the neck to the base.

4. The preform of claim 1, the preform comprising at least 90% polypropylene.

* * * * *